United States Patent
Woolsey et al.

(10) Patent No.: US 9,462,112 B2
(45) Date of Patent: Oct. 4, 2016

(54) USE OF A DIGITAL ASSISTANT IN COMMUNICATIONS

(71) Applicant: Microsoft Corporation, Redmond, WA (US)

(72) Inventors: Kerry Woolsey, Duvall, WA (US); Larry Jin, Bellevue, WA (US); Pat Halvorsen, Clyde Hill, WA (US); Susan Chory, Seattle, WA (US); Rylan Hawkins, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/321,604

(22) Filed: Jul. 1, 2014

(65) Prior Publication Data

US 2015/0373183 A1 Dec. 24, 2015

Related U.S. Application Data

(60) Provisional application No. 61/014,174, filed on Jun. 19, 2014.

(51) Int. Cl.
*H04N 7/15* (2006.01)
*H04M 1/725* (2006.01)
(Continued)

(52) U.S. Cl.
CPC .......... *H04M 1/72563* (2013.01); *G10L 15/22* (2013.01); *H04M 1/7255* (2013.01); *H04N 7/15* (2013.01); *H04W 4/12* (2013.01)

(58) Field of Classification Search
CPC ............ H04N 7/152; G10L 2015/088; G06K 9/00355

USPC ....................................................... 348/14.08
See application file for complete search history.

(56) References Cited

U.S. PATENT DOCUMENTS 6,671,262 B1 * 12/2003 Kung et al. ................... 370/260
8,000,454 B1 * 8/2011 Or-Bach et al. ........... 379/88.18
(Continued)

FOREIGN PATENT DOCUMENTS

CN 103593230 A 2/2014
WO 2014023308 A1 2/2014

OTHER PUBLICATIONS

"International Search Report & Written Opinion Received for PCT Application No. PCT/US2015/036112", Mailed Date: Aug. 28, 2015, (11 pages total).

(Continued)

*Primary Examiner* — Creighton Smith
(74) *Attorney, Agent, or Firm* — Bryan Webster; Judy Yee; Micky Minhas

(57) ABSTRACT

A digital assistant operating on a device is configured to be engaged as an active participant in communications between local and remote parties by listening to voice and video calls and participating in messaging sessions. The digital assistant typically can be initiated by voice using a key word or phrase and then be requested to perform tasks, provide information and services, etc. using voice or gestures. The digital assistant can respond to the request and take appropriate actions. In voice and video calls, the interactions with the digital assistant (i.e., the request, response, and actions) can be heard by both parties to the call as if the digital assistant was a third party on the call. In a messaging session, messages are generated and displayed to each participant so that they can see the interactions with the digital assistant as if it was a participant.

5 Claims, 26 Drawing Sheets

(51) Int. Cl.
*H04W 4/12* (2009.01)
*G10L 15/22* (2006.01)

(56) References Cited

U.S. PATENT DOCUMENTS

| | | | |
|---|---|---|---|
| 8,731,942 B2 | 5/2014 | Cheyer et al. | |
| 8,924,219 B1* | 12/2014 | Bringert et al. | 704/275 |
| 2002/0122541 A1* | 9/2002 | Metcalf | H04L 12/2856 379/88.02 |
| 2007/0041361 A1 | 2/2007 | Iso-Sipila | |
| 2007/0050191 A1 | 3/2007 | Weider et al. | |
| 2009/0150156 A1 | 6/2009 | Kennewick et al. | |
| 2010/0250253 A1 | 9/2010 | Shen | |
| 2010/0312547 A1 | 12/2010 | Van Os et al. | |
| 2011/0014952 A1 | 1/2011 | Minton | |
| 2011/0211677 A1* | 9/2011 | Basner | 379/88.03 |
| 2013/0141516 A1 | 6/2013 | Baldwin | |
| 2013/0239140 A1* | 9/2013 | Demirtshian et al. | 725/37 |
| 2013/0346078 A1* | 12/2013 | Gruenstein et al. | 704/235 |
| 2014/0122059 A1* | 5/2014 | Patel et al. | 704/9 |
| 2015/0106086 A1* | 4/2015 | Oh et al. | 704/231 |

OTHER PUBLICATIONS

"iOS 8: Hey, Siri", Published on Jun. 3, 2014, Available at: https://www.youtube.com/watch?v=5n8Z5BmSSx8&,feature=youtu.be (1 page total).

"Second Written Opinion Issued in PCT Application No. PCT/US2015/036112", Mailed Date: May 30, 2016, (6 Pages total).

"International Preliminary Report on Patentability Issued in PCT Application No. PCT/US2015/036112", Mailed Date: Jul. 27, 2016, 7 Pages total.

* cited by examiner

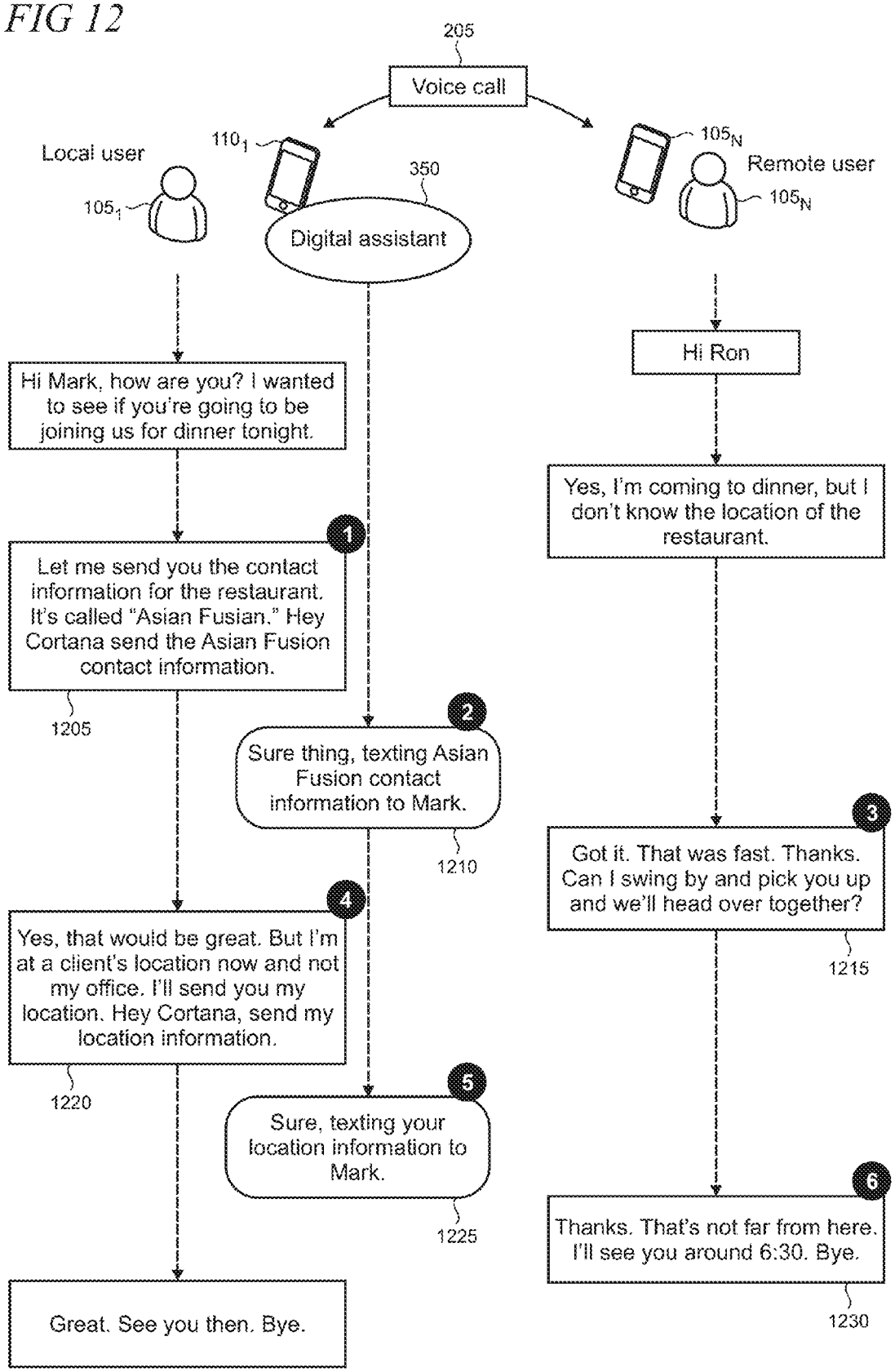

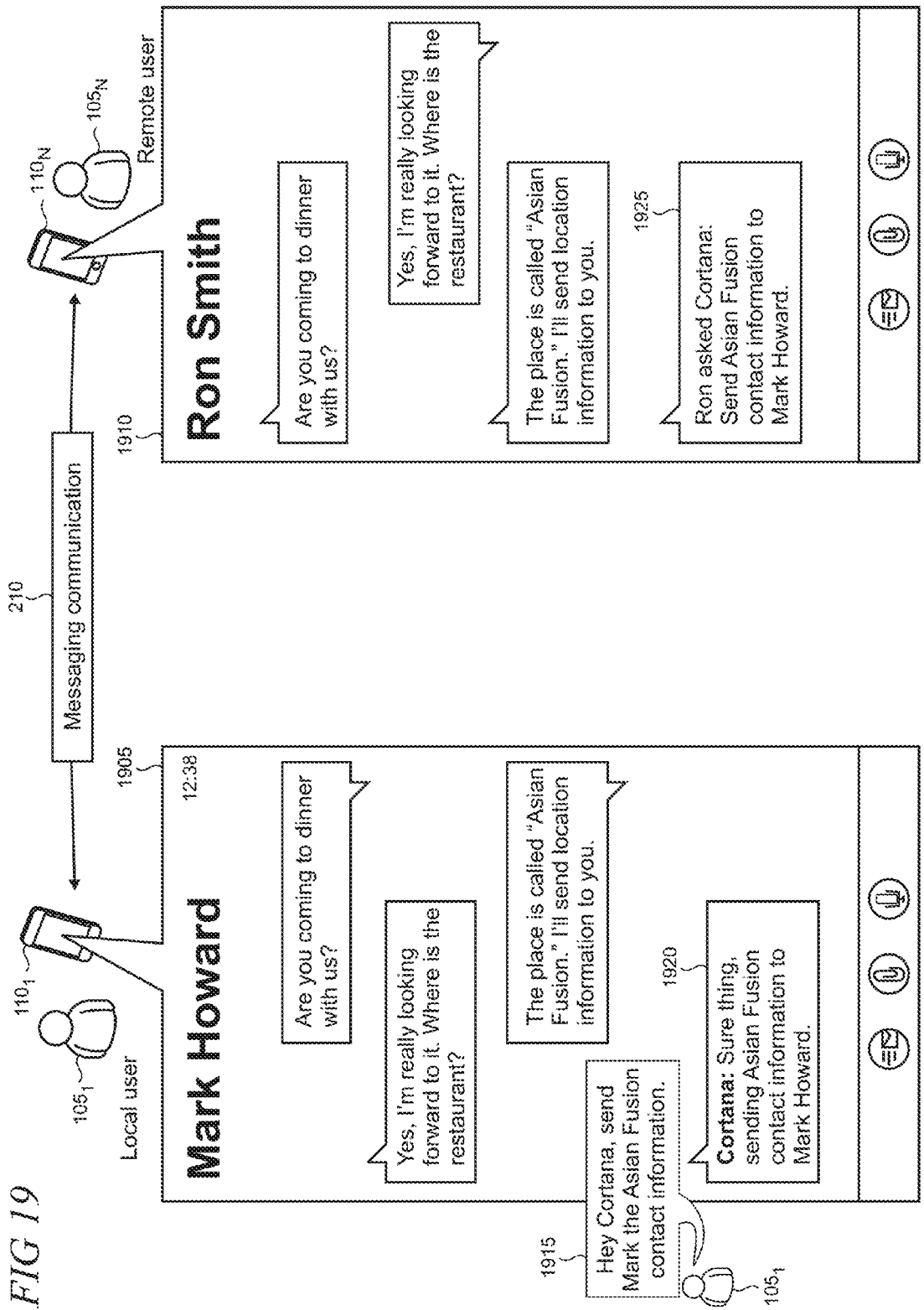

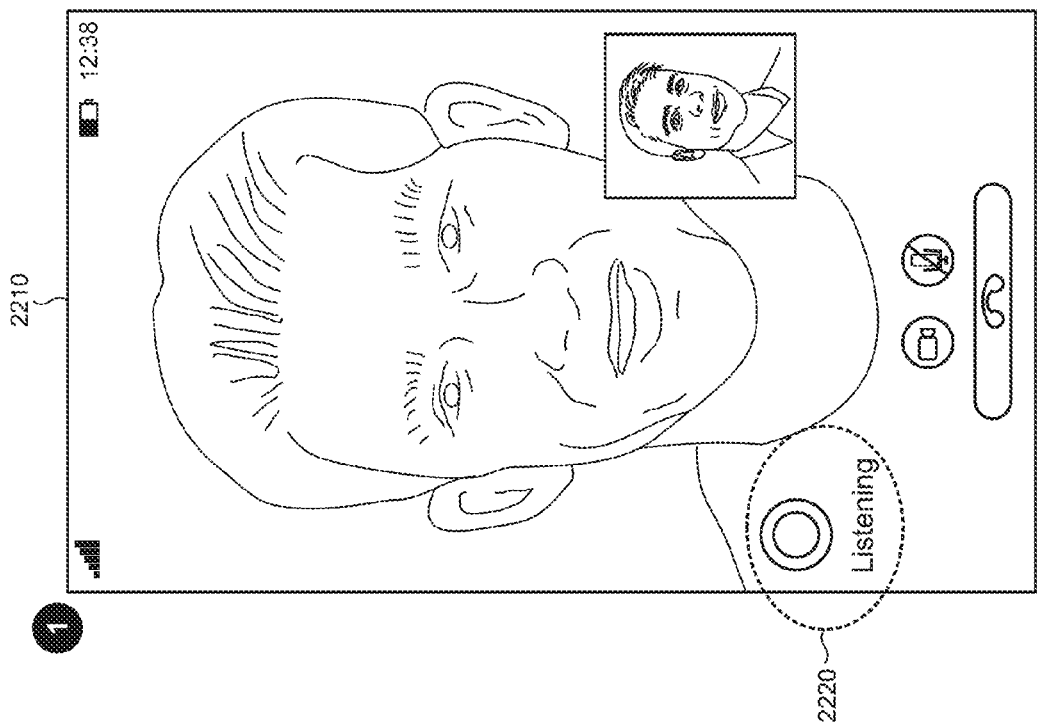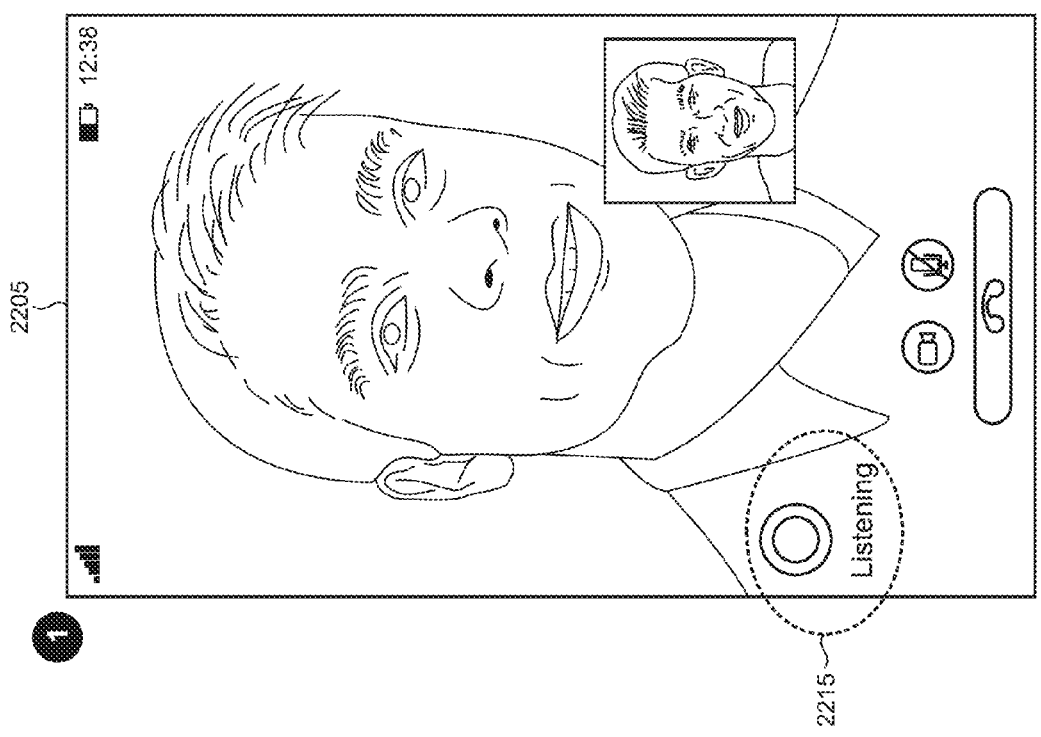
FIG 22

USE OF A DIGITAL ASSISTANT IN COMMUNICATIONS

STATEMENT OF RELATED APPLICATION

This application claims the benefit of provisional application No. 62/014,174 filed Jun. 19, 2014, the disclosure of which is incorporated by reference herein.

BACKGROUND

A user often wants or needs to multi-task so that various tasks can be performed while communicating with others using devices such as smartphones or computers. However, attempting to multi-task while in a communication can often lead to a disjointed, halting, or confusing interaction. Some conventional solutions have attempted to address the problem of disjointed communications when attempting to multi-task by adding additional controls (e.g., buttons) into a communication application. Unfortunately, such additional controls can often make the communication application user interface (UI) crowded, more difficult to operate, and confusing to the user. In addition, such solutions end up making it easier for users to leave the communication application and do nothing to keep the remote party involved in what is happening. Other conventional solutions use some form of digital assistant that are available on a variety of computing platforms but the ability to employ them in useful ways during communications with another party is very limited.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A digital assistant supported on a device such as a smartphone, personal computer, or game console is configured to be engaged as an active participant in communications between local and remote parties by listening to voice and video calls and participating in messaging sessions. The digital assistant typically can be initiated by voice using a key word or phrase and then be requested to perform tasks, provide information and services, etc., using voice commands, natural language requests, or gestures in some cases. The digital assistant can respond to the request and take appropriate actions. In voice and video calls, the interactions with the digital assistant (i.e., the request, response, and actions) can be heard by both parties to the call as if the digital assistant was a third party on the call. In a messaging session, messages are generated and displayed to each participant so that they can see the interactions with the digital assistant as if it was a participant.

In various illustrative examples, the digital assistant maintains awareness of call state and other context using inputs from various sources so that it is enabled to take actions that appear natural while reducing the burden on the user. Thus, on a four-way conference call with John the user, and Tom, Richard, and Harry, the user can say "schedule a meeting for us" and the digital assistant understands that the word "us" refers to the four participants. The digital assistant can acknowledge the request and verbally state that it is sending out meeting requests. The statement is injected into the audio of the call so that all the conference call participants can hear the digital assistant speaking. In a voice call, interactions with the digital assistant are confirmed visually on a UI supported by a device's phone application. In a video call, the digital assistant interactions are captured in a picture-in-picture (PIP) overlay that is displayed locally and inserted in the outgoing video stream so that all the call participants can see it.

Other examples of the use of context by the digital assistant include consideration of the time of day, the user's location, the user's schedule, attributes of the other parties, etc., when performing a given action or task. Thus, the digital assistant can take different actions depending on whether the user is on vacation at a resort outside the country or if the user is at the office during work hours just before a scheduled meeting to review architectural plans for a proposed building. For example, in the vacation scenario the digital assistant can respond to the user's request "send the pictures I took" when on a call with a relative by sending photographs taken by the user of the resort earlier in the day to the relative in an email or text message. In the office scenario, the digital assistant can send photographs of the current site for the proposed building that are needed for the presentation at the meeting when the user is on a call with an assistant.

A variety of tasks may be performed and actions taken by the digital assistant during communications. These include, for example, interacting with the user (which may involve the digital assistant asking clarifying questions, and/or following up with the user), performing various tasks, providing services, gathering information (e.g., by accessing a search service), operating the device, and performing various other functions to assist the user during a communication session whether it be voice, video, or messaging. In addition, in some cases applications running on the device can interact with the digital assistant. For example, the user may wish to interact with the digital assistant using a text message application (for example, using what is commonly referred to as an "over-the-top messaging application" rather than a first party texting application that is provided by a mobile network operator) in which the digital assistant can behave just like a regular messaging participant. This enables silent interaction as well as provides a convenient way to keep a record of interactions with the digital assistant.

Advantageously, the present use of a digital assistant in communications enables tasks to be performed in a way that provides a comprehensive feature set using a streamlined and simplified UI while simultaneously making the interactions with the digital assistant understandable for the other parties to the communications. The digital assistant participates in the communications and performs actions and tasks without needing the user to leave the communication application so that the overall user experience is seamlessly enhanced with additional functionality without interruptions or having to put a call or communication on pause. Successful multi-tasking in real-world scenarios is also enabled as the digital assistant functions as a welcomed third party to communications so that the need for users to have to switch in and out of various applications and contexts is substantially reduced.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 12 shows an illustrative transcript of audio interactions among a digital assistant and parties to a voice call;

FIGS. 19 and 20 show screen captures of illustrative UIs shown by a messaging application at various points during a messaging session;

FIGS. 22, 23, and 24 show screen captures of illustrative UIs shown by video calling applications on devices at various points during a video call communication;

Like reference numerals indicate like elements in the drawings. Elements are not drawn to scale unless otherwise indicated.

DETAILED DESCRIPTION

Figure 1:
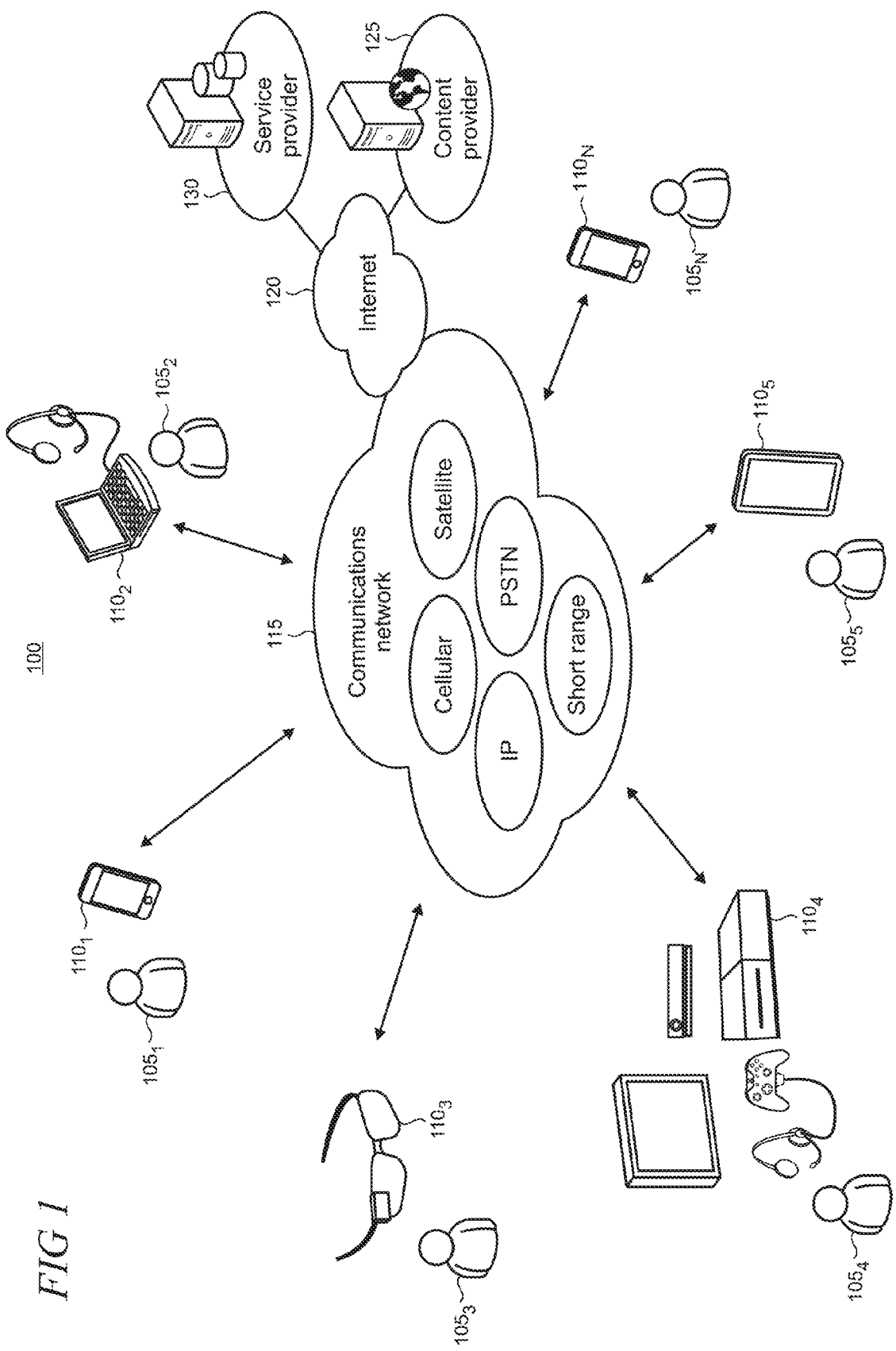
FIG. 1 shows an illustrative environment in which devices having communications capabilities interact over a network.

FIG. 1 shows an illustrative environment 100 in which various users 105 employ respective devices 110 that communicate over a communications network 115. The devices 110 provide voice telephony capabilities and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like. However, alternative types of electronic devices are also envisioned to be usable within the communications environment 100 so long as they are configured with communication capabilities and can connect to the communications network 115. Such alternative devices variously include handheld computing devices, PDAs (personal digital assistants), portable media players, devices that use headsets and earphones (e.g., Bluetooth-compatible devices), phablet devices (i.e., combination smartphone/tablet devices), wearable computers, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited UI. Some devices may support video consumption and Internet browsing, while other devices may support more limited media handling and network interface features.

As shown, the devices 110 can access the communications network 115 in order to implement various user experiences. The communications network can include any of a variety of network types and network infrastructure in various combinations or sub-combinations including cellular networks, satellite networks, IP (Internet-Protocol) networks such as Wi-Fi and Ethernet networks, a public switched telephone network (PSTN), and/or short range networks such as Bluetooth networks. The network infrastructure can be supported, for example, by mobile operators, enterprises, Internet service providers (ISPs), telephone service providers, data service providers, and the like. The communications network 115 typically includes interfaces that support a connection to the Internet 120 is also typically supported so that the mobile devices 110 can access content provided by one or more content providers 125 and access a service provider 130 in some cases. Accordingly, the communications network 115 is typically enabled to support various types of device-to-device communications including over-the-top communications, and communications that do not utilize conventional telephone numbers in order to provide connectivity between parties.

Figure 2:
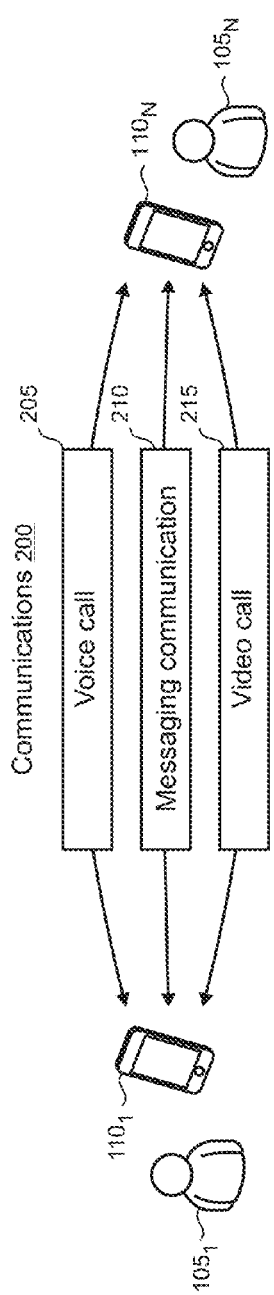
FIG. 2 shows various illustrative communication types including voice calling, messaging communications, and video calling.

The devices 110 and communications network 115 may be configured to enable device-to-device communication. As shown in FIG. 2, such device-to-device communication 200 can include, for example, voice calls 205, messaging conversations 210, and video calls 215. Support for device-to-device communication 200 may be provided using various applications that run on a device 110.

Figure 3:
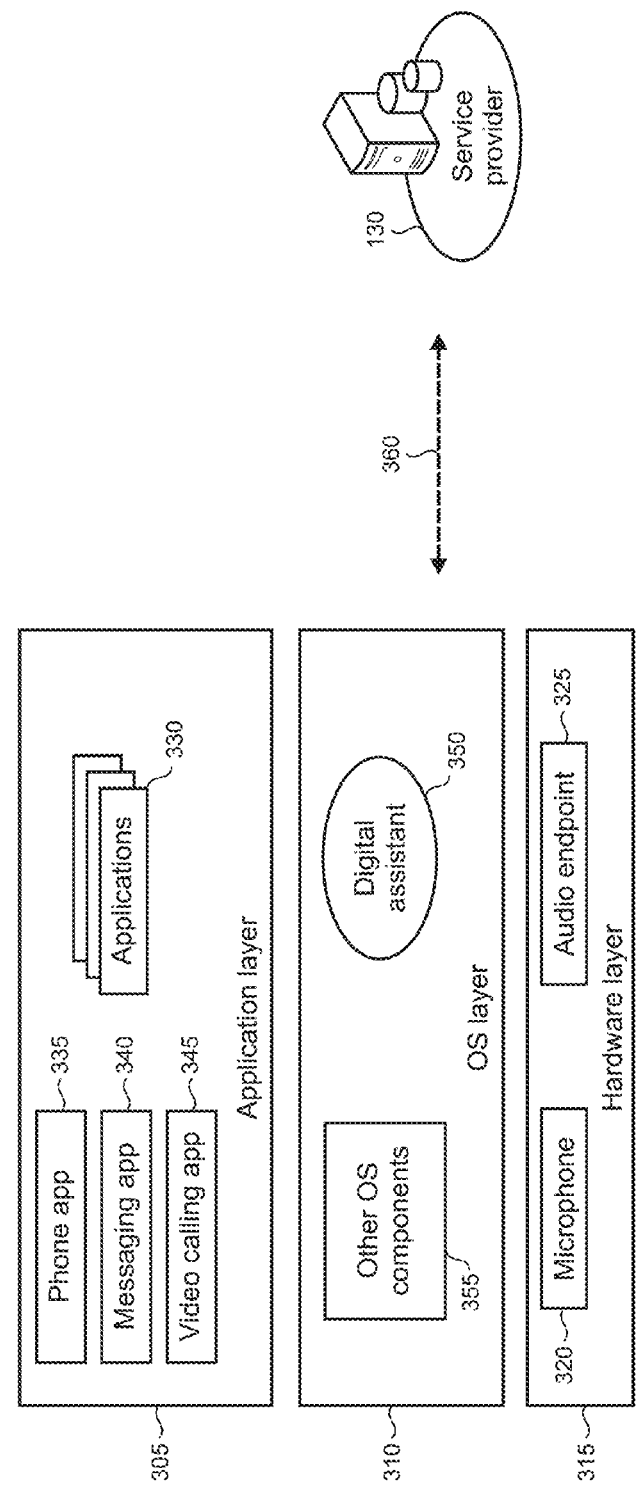
FIG. 3 shows an illustrative layered architecture that includes a digital assistant component.

For example, FIG. 3 shows an illustrative layered architecture 300 that may be instantiated on a given device 110 that supports the applications. The architecture 300 is typically implemented in software, although combinations of software, firmware, and/or hardware may also be utilized in some cases. The architecture 300 is arranged in layers and includes an application layer 305, an OS (operating system) layer 310, and a hardware layer 315. The hardware layer 315 provides an abstraction of the various hardware used by the device 110 (e.g., input and output devices, networking and radio hardware, etc.) to the layers above it. In this illustrative example, the hardware layers support a microphone 320 and audio endpoint 325 which may include, for example, the device's internal speaker, a wired or wireless headset/earpiece, external speaker/device, and the like.

The application layer 305 in this illustrative example supports various applications (apps) 330 (e.g., web browser, map app, email app, etc.), as well as a phone app 335, messaging app 340, and video calling app 345, such as Skype™. The apps are often implemented using locally executing code. However in some cases, these apps may rely on services and/or remote code execution provided by remote servers or other computing platforms such as those supported by the service provider 130 or other cloud-based resources. While the apps 330, 335, 340, and 345 are shown here as components that are instantiated in the application layer 305, it will be appreciated that the functionality provided by a given app may be implemented, in whole or part, using components that are supported in either the OS or hardware layers.

The OS layer 310 supports a digital assistant 350 and various other OS components 355. In some cases, the digital assistant 350 can interact with the service provider 130, as indicated by line 360. That is, the digital assistant in some implementations can partially utilize or fully utilize remote code execution supported at the service provider 130, or using other remote resources. In addition, it may utilize and/or interact with the other OS components 355 (and/or other components that are instantiated in the other layers of the architecture 300) as may be needed to implement the various features and functions described herein. While the digital assistant 350 is shown in this illustrative example as being instantiated in the OS layer 310, it will be appreciated that the functionality provided by the digital assistant may be implemented, in whole or part, using components that are supported in either the application or hardware layers.

Figure 4:
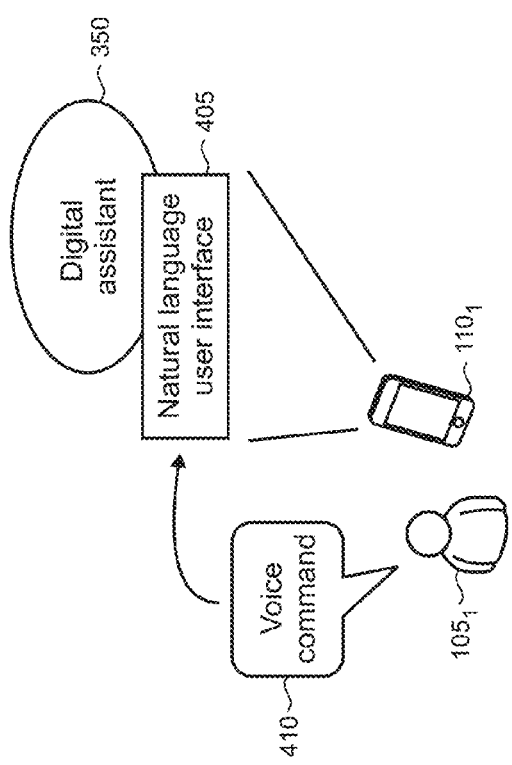

As shown in FIG. 4, the digital assistant 350 can employ a natural language user interface (UI) 405 that can take voice commands 410 as inputs from the user 105. The voice commands 410 can be used to invoke various actions, features, and functions on a device 110, provide inputs to the systems and applications, and the like. In some cases, the voice commands 410 can be utilized on their own in support of a particular user experience while in other cases the voice commands can be utilized in combination with other non-voice commands or inputs such as those implementing physical controls on the device or virtual controls implemented on a UI or those using gestures (as described below).

Figure 5:
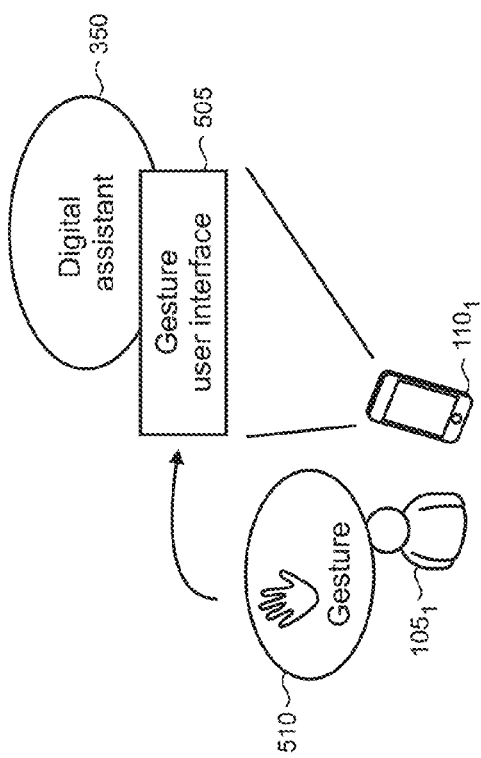
FIGS. 4 and 5 show illustrative interfaces between a user and a digital assistant.

The digital assistant 350 can also employ a gesture UI 505 as shown in FIG. 5. Here, the gesture UI 505 can sense gestures 510 performed by the user 105 as inputs to invoke various actions, features, and functions on a device 110, provide inputs to the systems and applications, and the like. The user gestures 510 can be sensed using various techniques such as optical sensing, touch sensing, proximity sensing, and the like. In some cases, various combinations of voice commands, gestures, and physical manipulation of real or virtual controls can be utilized to interact with the digital assistant. In some scenarios, the digital assistant can be automatically invoked. For example, as the digital assistant typically maintains awareness of call state and other context, the digital assistant may be invoked by specific context such as a dropped call. In this case, the digital assistant can initiate a redial to reconnect the call and inform the user of the reconnection attempt. The digital assistant can also provide the user with other communications options, such as sending a text message, when the digital assistant detects that a reconnection is not possible (for example, no or low cellular signal), the line is busy, or after some number of unsuccessful reconnection attempts.

Figure 6:
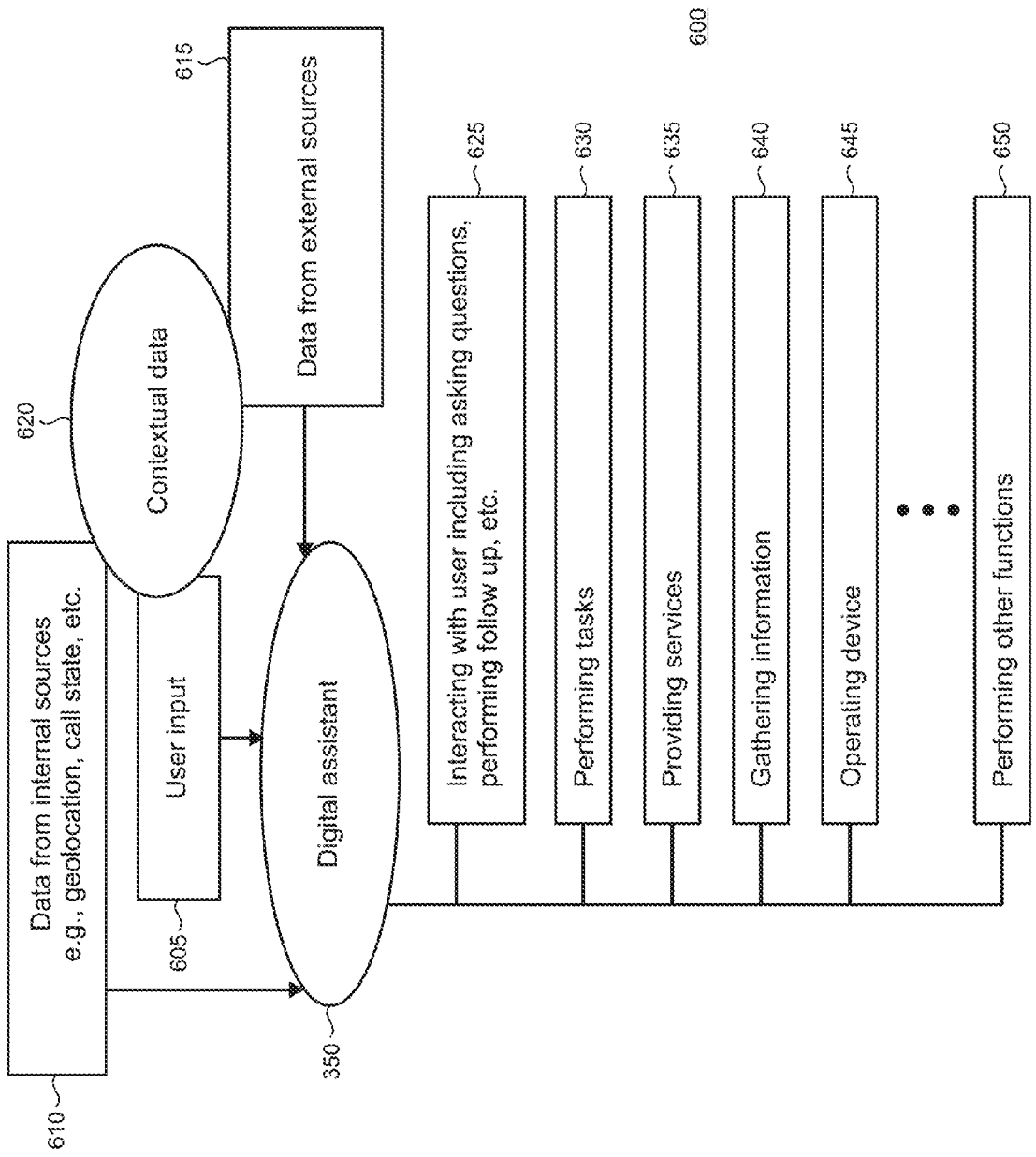
FIG. 6 shows illustrative inputs to a digital assistant and an illustrative taxonomy of general functions that may be performed by a digital assistant.

FIG. 6 shows an illustrative taxonomy of functions 600 that may typically be supported by the digital assistant 350. Inputs to the digital assistant 350 typically can include user input 605 (in which such user input can include input from either or both the local and remote parties to a given communication), data from internal sources 610, and data from external sources 615. For example, data from internal sources 610 could include the current geolocation of the device 110 that is reported by a GPS (Global Positioning System) component on the device, or some other location-aware component. The externally sourced data 615 includes data provided, for example, by external systems, databases, services, and the like such as the service provider 130 (FIG. 1). The various inputs can be used alone or in various combinations to enable the digital assistant 350 to utilize contextual data 620 when it operates. Contextual data can include, for example, time/date, the user's location, language, schedule, applications installed on the device, the user's preferences, the user's behaviors (in which such behaviors are monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences, etc.), and the like. Additional illustrative examples of the use of context by the digital assistant are provided below.

As shown, the functions 600 illustratively include interacting with the user 625 (through the natural language UI and other graphical UIs, for example); performing tasks 630 (e.g., making note of appointments in the user's calendar, sending messages and emails, etc.); providing services 635 (e.g., answering questions from the user, mapping directions to a destination, etc.); gathering information 640 (e.g., finding information requested by the user about a book or movie, locating the nearest Italian restaurant, etc.); operating the device 645 (e.g., setting preferences, adjusting screen brightness, turning wireless connections such as Wi-Fi and Bluetooth on and off, etc.); and performing various other functions 650. The list of functions 600 is not intended to be exhaustive and other functions may be provided by the digital assistant as may be needed for a particular implementation of the present use of a digital assistant in communications.

Figure 9:
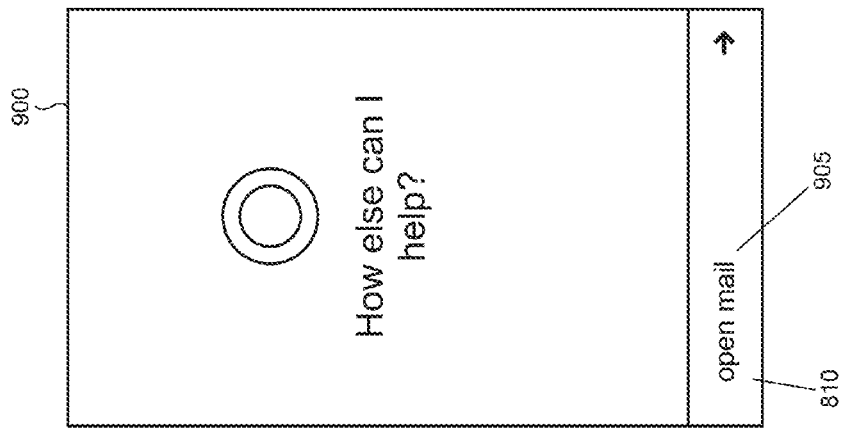
FIGS. 7, 8, and 9 show screen captures of illustrative user interfaces (UIs) exposed by a digital assistant.
Figure 8:
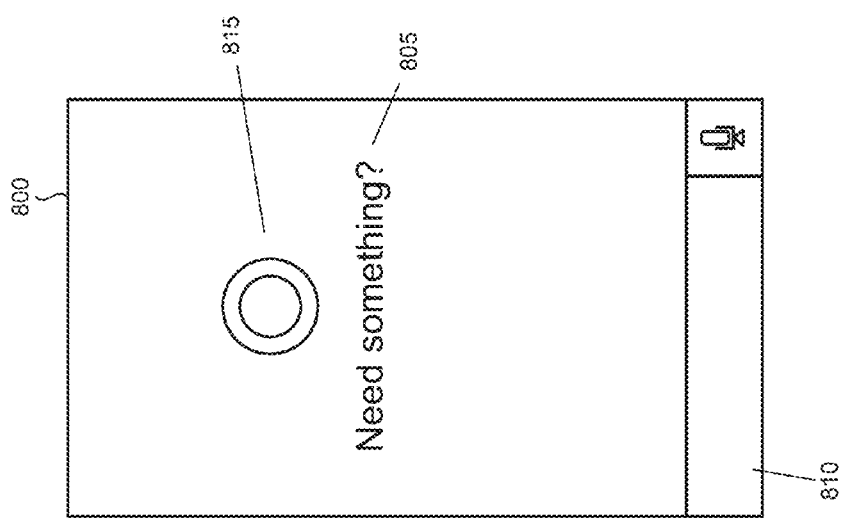
Figure 7:
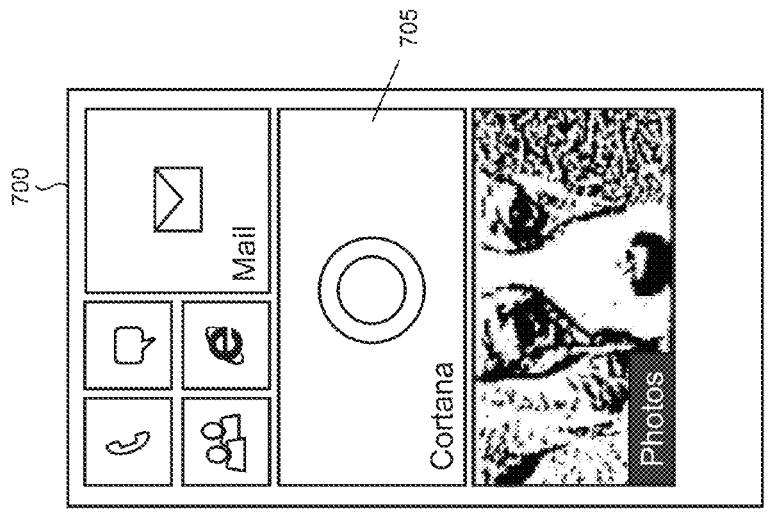

The digital assistant 350 can be exposed to the user 105 through a UI that is displayed on the device. For example, FIGS. 7, 8, and 9 show various illustrative screen captures of UIs that may be utilized in the present use of a digital assistant in communications. It is emphasized that the particular UIs displayed in the drawings can vary from what is shown according to the needs of a particular implementation. UI 700 in FIG. 7 shows the digital assistant (named "Cortana" in this example) represented by a tile 705 that is displayed along with tiles representing other apps or user experiences on a start screen of a device. The digital assistant may also be configured to be launched from any location within any UI on the device, or from within any current user experience. For example, the user 105 can be on a phone call, browsing the web, watching a video, or listening to music, and simultaneously launch the digital assistant from within any of those experiences. In some cases the digital assistant can be launched through manipulation of a physical or virtual user control, and/or by voice command and/or gesture in other cases.

When the user invokes the digital assistant, for example, by touching the tile 705 or by invoking a voice command or gesture, a UI 800 shown in FIG. 8 is displayed on the device 110 that includes a text string 805 that asks the user if something is needed. In alternative implementations, text to voice translation can be employed so that an audio message can be played in place of, or to supplement the text string 805. As shown, the UI includes a box 810 that is configured for showing a textual representation of a received voice command or other user input.

One or more graphic objects 815 can be displayed on the UI 800 to represent the digital assistant to the user. The graphic object 815 in this example is a circular shape that can be animated so that, for example, it changes its shape, color, transparency, motion, or appearance as the digital assistant performs tasks, provides information, interacts with the user, etc.

As shown in the UI 900 in FIG. 9, the user has input the string "open mail" 905 into the box 810 using, for example, keypad input or voice command. In response to the input, the digital assistant can launch an email application on the device. Thus, for example, when the user is on a call and the remote party asks "have you read the email I sent you yet?" the user can ask the digital assistant to open the email from the remote party and read it back. As the digital assistant maintains awareness of call state and context, it knows the identity of the remote party and can locate the desired email for the user.

Figure 10:
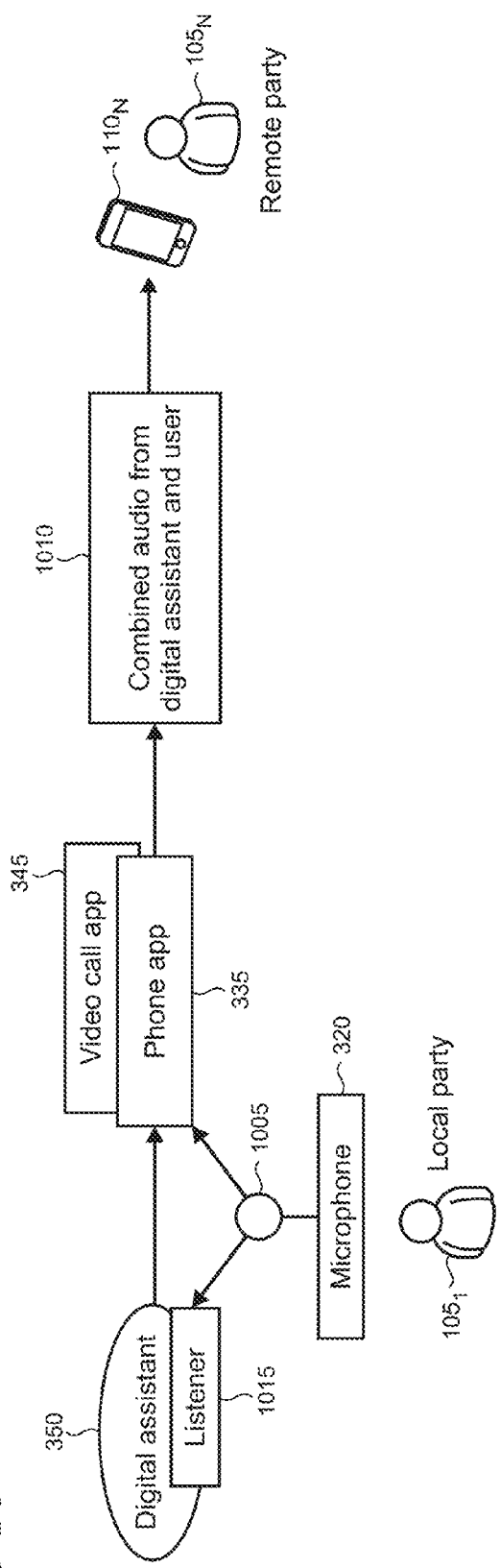
FIG. 10 shows an illustrative arrangement in which audio captured by a microphone is split so that it is received by a digital assistant and phone/video call applications.
Figure 11:
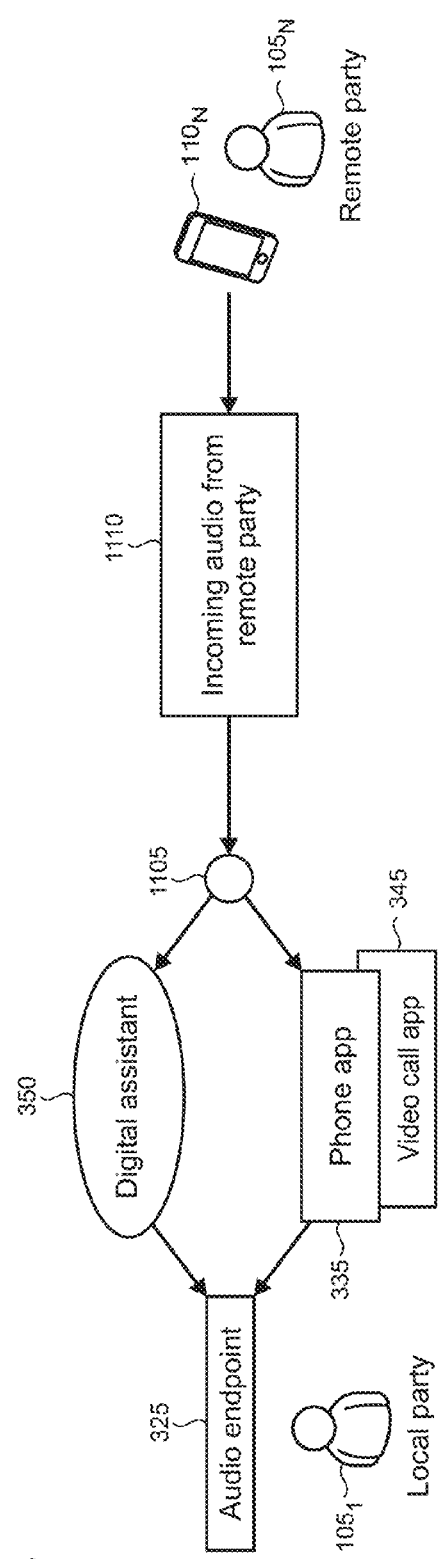
FIG. 11 shows an illustrative arrangement in which incoming audio is split so that it is received by a digital assistant and phone/video call applications.

When the user is involved in a voice or video communication with one or more remote parties, the digital assistant can be configured to be a part of the communication and perform tasks as needed. As shown in FIG. 10, the audio from the microphone 320 is split into two streams at a split point 1005 so that both the phone and video call apps 335 and 345 as well as the digital assistant 350 can receive audio signals from the user 105. Audio from the apps is combined with audio generated by the digital assistant to create a combined audio stream 1010 so that the remote user at the far end of the communication can hear what both the local user and the digital assistant say. The digital assistant exposes a listener 1015 that listens for a keyword or phrase from the user that is used to invoke the digital assistant. Likewise, as shown in FIG. 11, incoming audio 1110 from the remote party at the far end is split into two streams at a split point 1105 so that both the digital assistant 350 and the phone and video call apps 335 and 345 can receive the incoming audio. It is noted that the terms "user" and "party" may be used interchangeably in the discussion that follows.

Having the digital assistant 350 become a part of communications such as phone calls, messaging conversations, and video calls can enable a wide range of rich user experiences. One exemplary experience is shown in FIG. 12 which provides a transcript of what is spoken during an illustrative voice call 205. As the parties are talking on the call, the local user invokes the digital assistant by saying the key phrase "Hey Cortana" at point 1 in the call at block 1205. It is emphasized that this particular key phrase is intended be illustrative and that other key words, phrases, or other methods of invocation can be utilized depending on the needs of a particular implementation of the present use of a digital assistant in communications.

For example, various heuristics, learning-algorithms, and/or policies can be utilized that take into account available inputs, contexts, and the user's behaviors and interactions with the digital assistant. Accordingly, if the user has established a history of invoking the digital assistant during the weekly sales meeting, for example, then the digital assistant can be automatically invoked for all future instances of that meeting. Or, if the user tends to invoke the digital assistant while driving to and from work, then the digital assistant can be automatically invoked during the next work trip (but not necessarily be automatically invoked when the user drives to the shopping mall). In some implementations, a user interface can be exposed that enables the user to select or adjust how the digital assistant will be automatically invoked. The user may also be enabled to override automatic invocations in some cases in which instances of user overrides can be included as part of the learned behavior of the digital assistant.

Figure 13:
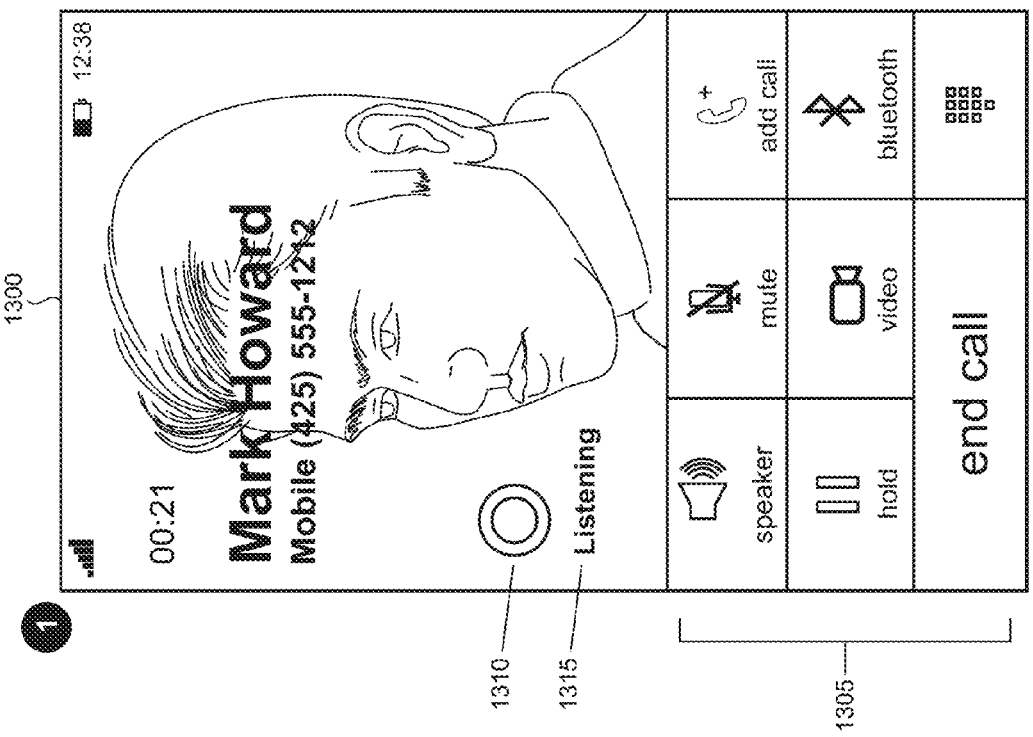

FIG. 13 depicts a screen capture of a UI 1300 shown by the phone app on the device when the user invokes the digital assistant at point 1 in the call. It is noted that all the UIs shown in the drawings are intended to be illustrative and that the presentation of information, exposed features and controls, and the overall look and feel of the UI can vary from what is shown by implementation. As shown in FIG. 13, the UI 1300 shows a picture and name of the called party (i.e., the remote party), the dialed number, and various call controls 1305 at the bottom of the UI. A graphic object 1310 associated with the digital assistant is shown on the UI along with a text string "listening" (indicated by reference numeral 1315) to graphically show to the user that the digital assistant was successfully launched, is listening in on the phone conversation, and is able to work on the user's task, provide information, etc. As noted above, the graphic object 1310 may be animated.

After the local user initiates the digital assistant with the key phrase in this example, the user requests that the digital assistant send contact information for a restaurant to the remote user. The digital assistant responds at point 2 in the call at block 1210 in FIG. 12 by saying that the contact information will be sent to the remote user as a message. The generated audio in the digital assistant's response to the user's request can be heard by both the local and remote parties. The digital assistant can also refer to the remote user by name. Use of the name is an example of how the digital assistant can apply contextual data that is available to it so that its interactions with the parties are more natural and the overall user experience supported by the digital assistant is enhanced. That is, the digital assistant maintains an awareness of the call context and thus knows the identity of the remote user as well as other call parameters.

Figure 14:
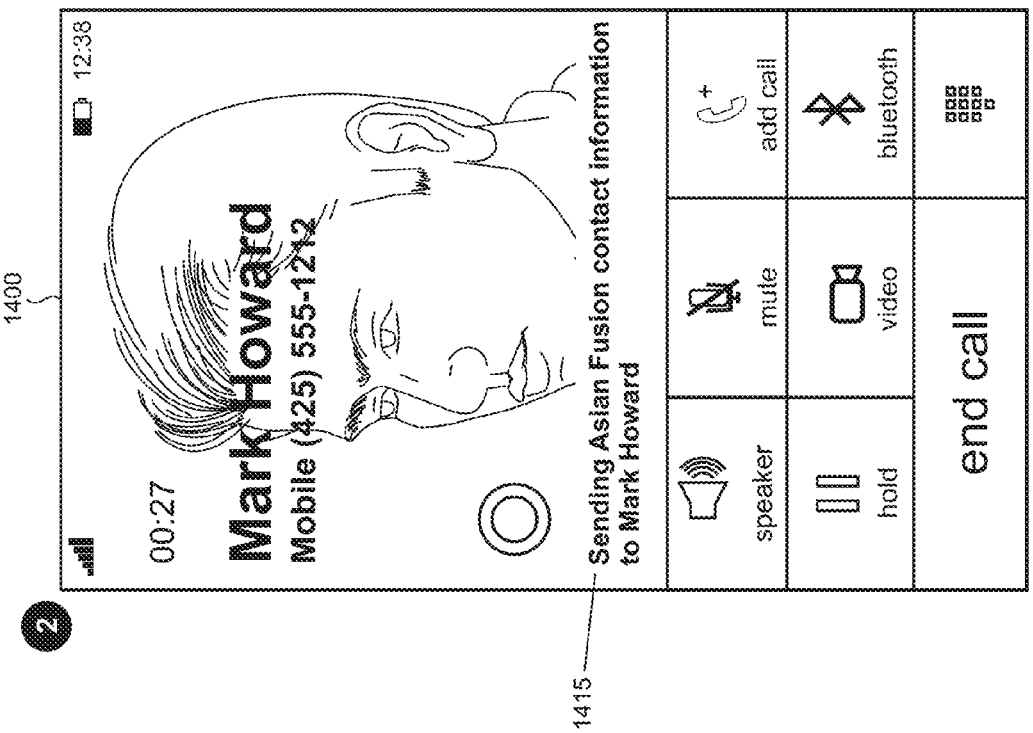
FIGS. 13-18 show screen captures of illustrative UIs shown by phone applications on devices at various points during a voice call communication.

FIG. 14 depicts a screen capture of a UI 1400 shown by the phone app on the device when the digital assistant responds to the user's request at point 2 in the call. A text string 1415 is displayed on the phone app's UI to visually confirm to the local user what the digital assistant is saying, namely that the restaurant contact information is being sent to the remote user at the far end of the call.

Figure 15:
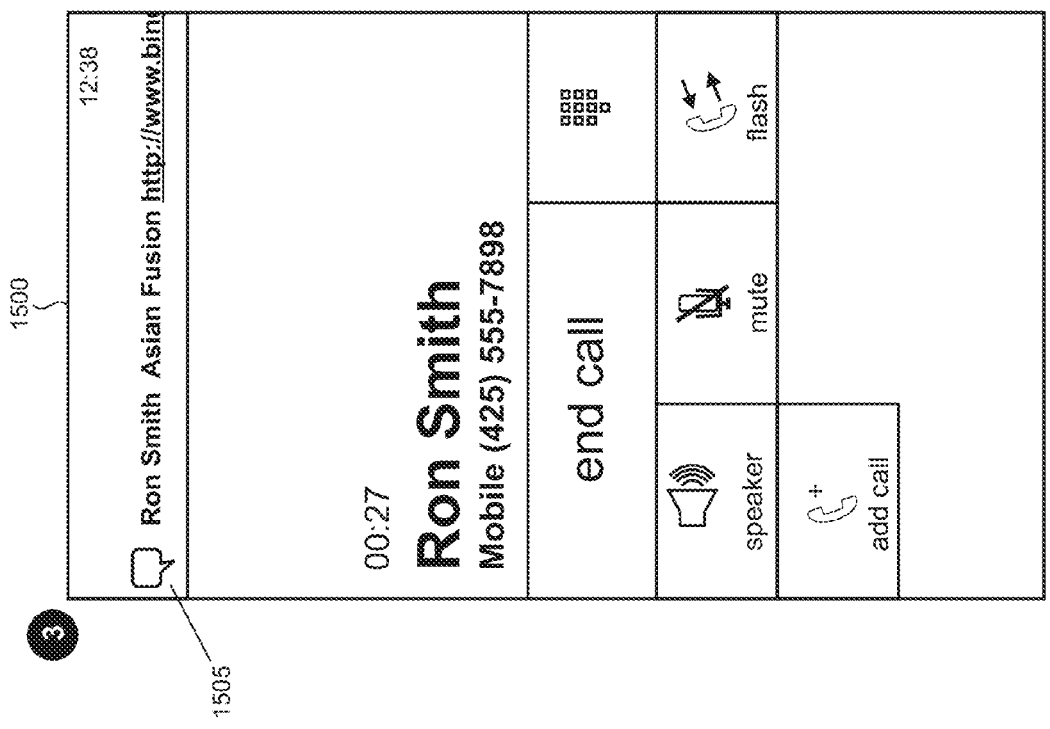

FIG. 15 depicts a screen capture of a UI 1500 that is displayed on the device of the remote user at point 3 in the call at block 1215 in FIG. 12. Here, the contact information sent by the digital assistant comes in as new message notification 1505 which is displayed at the top of the UI on the remote user's device. In this illustrative example, the notification shows the sender and a snippet of the content that is contained in the message. Typically, the remote user can launch the texting application to see the full content of the message which can include various kinds of contact information such as street address, link to website, phone number, map, etc.

Figure 16:
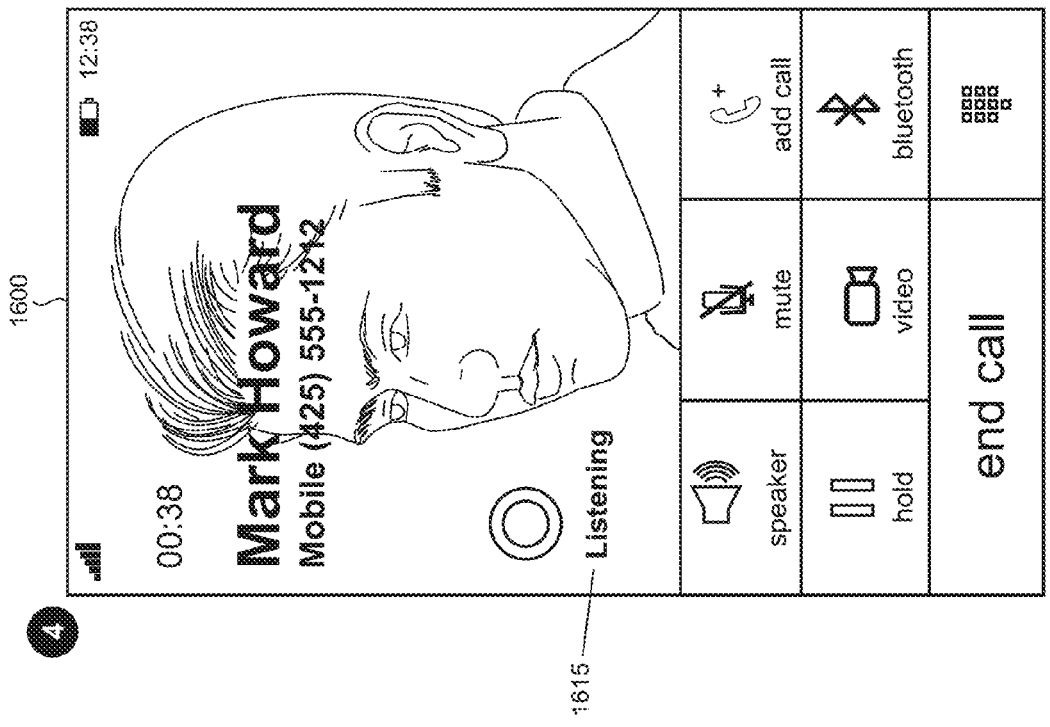

Returning to FIG. 12, later in the call at point 4 at block 1220, the local user requests that the digital assistant send the user's location information to the remote user. The user initiates the digital assistant by using the key phrase ("Hey Cortana" in this example). A text string "Listening" is again displayed on the phone app's UI 1600 as indicated by reference numeral 1615 in FIG. 16 to visually confirm to the local user that the digital assistant is listening in on the call and is ready to work on tasks, provide information, and the like.

The digital assistant responds at point 5 in the call at block 1225 in FIG. 12 by saying that the user's location information will be sent to the remote user as a message. As before, the generated audio in the digital assistant's response to the user's request can be heard by both the local and remote parties and the digital assistant can refer to the remote user by name. This provides another example of how the digital assistant can apply available contextual data to enhance the user experience. Here, the digital assistant maintains an awareness of the local user's location through geolocation data supplied by the device's internal sources.

Figure 17:
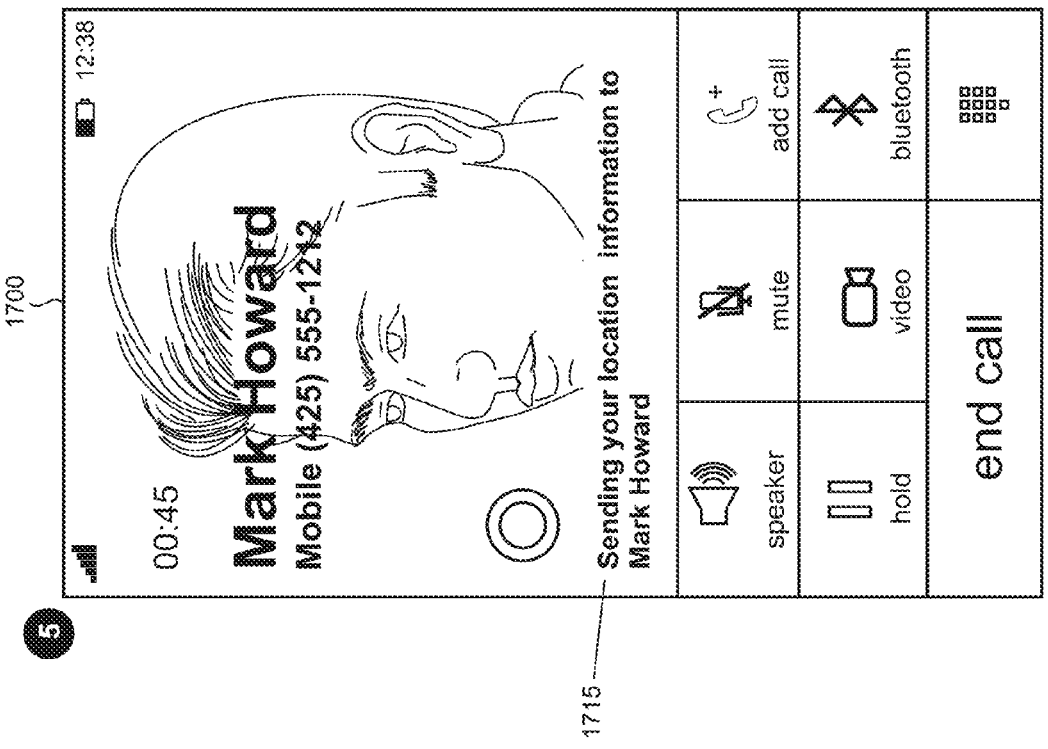

FIG. 17 depicts a screen capture of a UI 1700 shown by the phone app on the device when the digital assistant responds to the user's request at point 5 in the call. A text string 1715 is displayed on the phone app's UI to visually confirm to the local user what the digital assistant is saying verbally, namely that the user's location information is being sent to the remote user at the far end of the voice call.

Figure 18:
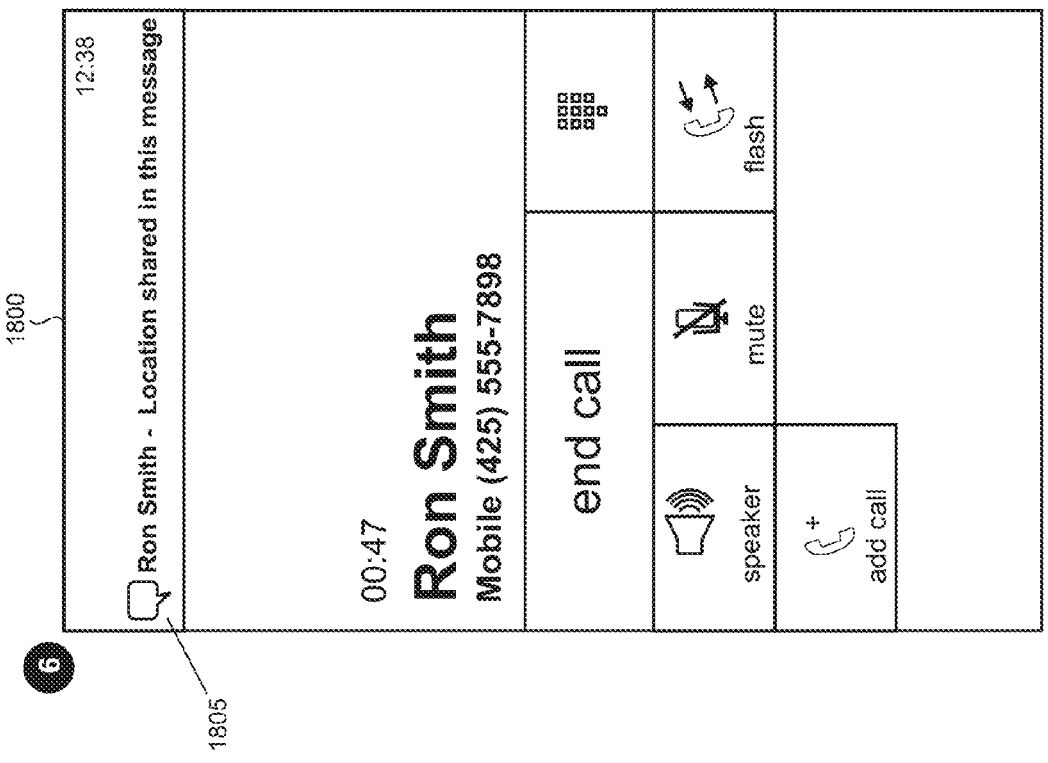

FIG. 18 depicts a screen capture of a UI 1800 that is displayed on the device of the remote user at point 6 in the call at block 1230 in FIG. 12. Here, the local user's contact information sent by the digital assistant comes in as new message notification 1805 which is displayed at the top on the UI on the remote user's device.

Figure 20:
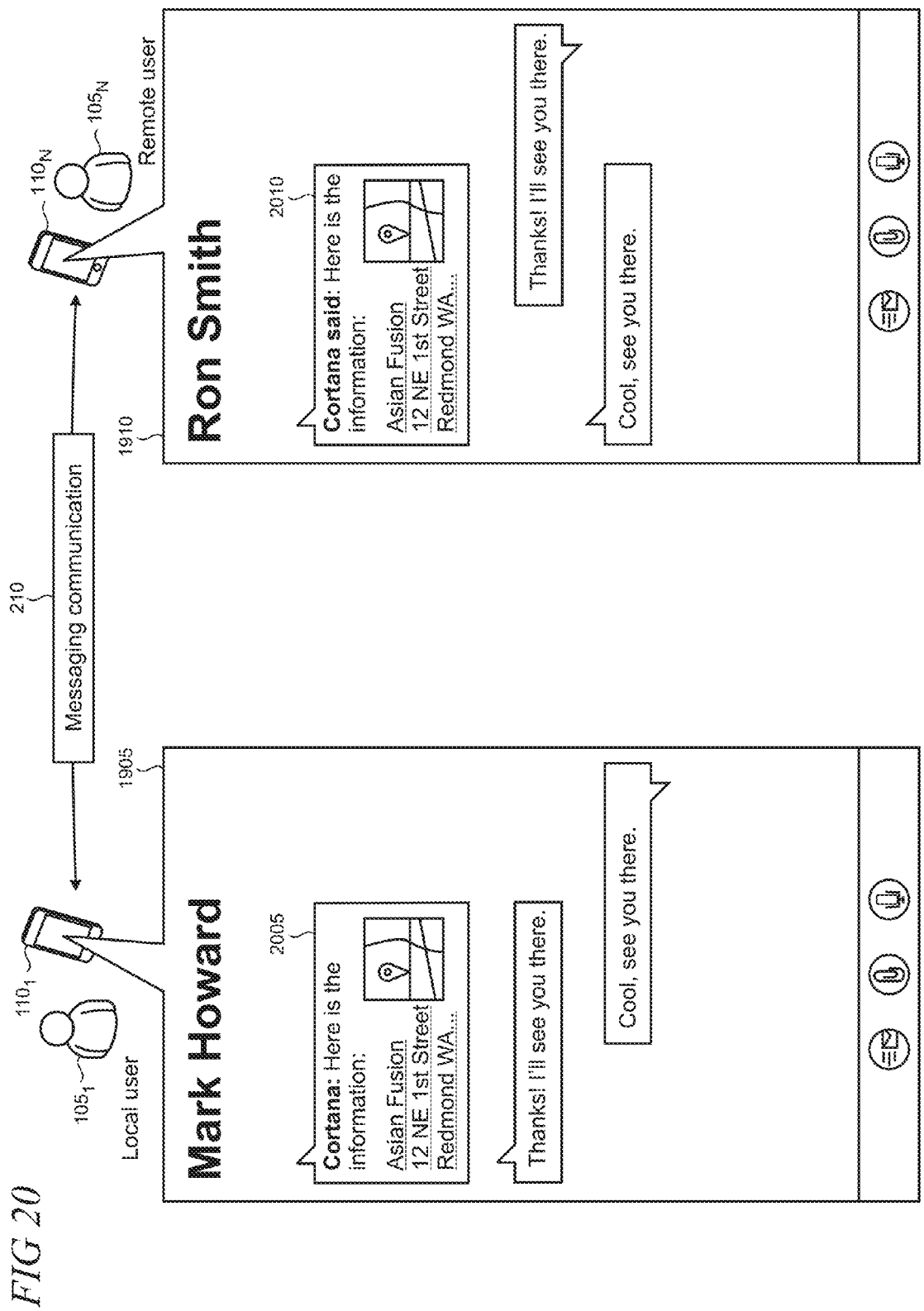

FIGS. 19 and 20 illustratively show how the digital assistant can be utilized in the course of a messaging conversation 210 between local and remote parties. UIs 1905 and 1910 are respectively exposed by messaging apps on the local and remote devices. Chains of text messages are shown in each UI with outgoing messages being shown on the right side and incoming messages from the other party being shown on the left side. While text messages are used in this particular illustrative example, it is noted that other forms and types of messages, including multimedia messages, voice, and video messages, may be supported by the present use of a digital assistant in communications. Accordingly, the term "messaging" can be considered as referring to all such forms and types of messages unless otherwise stated. In addition, while the present example shows a chain of messages, it is emphasized that the digital assistant can also interact with the user on a per-message basis.

At some point during the exchange of text messages, the local user launches the digital assistant by saying the key phrase "Hey Cortana" as indicated by reference numeral 1915. The local user then verbally requests the digital assistant to send contact information to the remote user.

The digital assistant injects its own text message into the messaging app UI on the local device, as indicated by reference numeral 1920 in FIG. 19, to visually show the local user how it is responding to the request. Here, the digital assistant indicates that it is sending the contact information to the remote user in the text message 1920. In some cases, the digital assistant can respond to the request using audio. The text message 1920 may typically be conspicuously marked in some manner so that it is clear to the local user that the message is from the digital assistant and not from the remote user. For example, the message can be labeled with the name of the digital assistant as shown, or be highlighted using special text, fonts, colors, graphics, etc. Messages showing the presence of the digital assistant may also be utilized in some cases. For example, messages can be utilized such as "Cortana has entered the conversation" or "Cortana has left the conversation" as the case may be.

In typical implementations, the messages from the digital assistant are persisted in the user's communications history with the remote user with full fidelity. This means that for many messaging experiences, such as those supported by rich, over-the-top applications, all parties to the communications gain the benefit of the interactions with the digital assistant. Thus, for example, remote messaging application users can see directions to an event that is provided by the digital assistant without having to the leave their current context.

In a similar manner as with the phone call example above (in which the remote user is enabled to hear what the digital assistant is saying when interacting with the local user at the local device), here the remote user is provided with an incoming text message 1925 that shows the interaction between the local user and the digital assistant. As shown in FIG. 20, the digital assistant provides the contact information in a text message 2005 on the local device as well as an incoming text message 2010 at the remote device. In this example, the text message includes the name and address of the restaurant of interest as a link that may be followed for more information. A map, in this example, is also provided in the text message that can typically be used to launch a map app on a respective device that can provide a map of the area, directions to the restaurant, nearby points of interest, etc.

Figure 21:
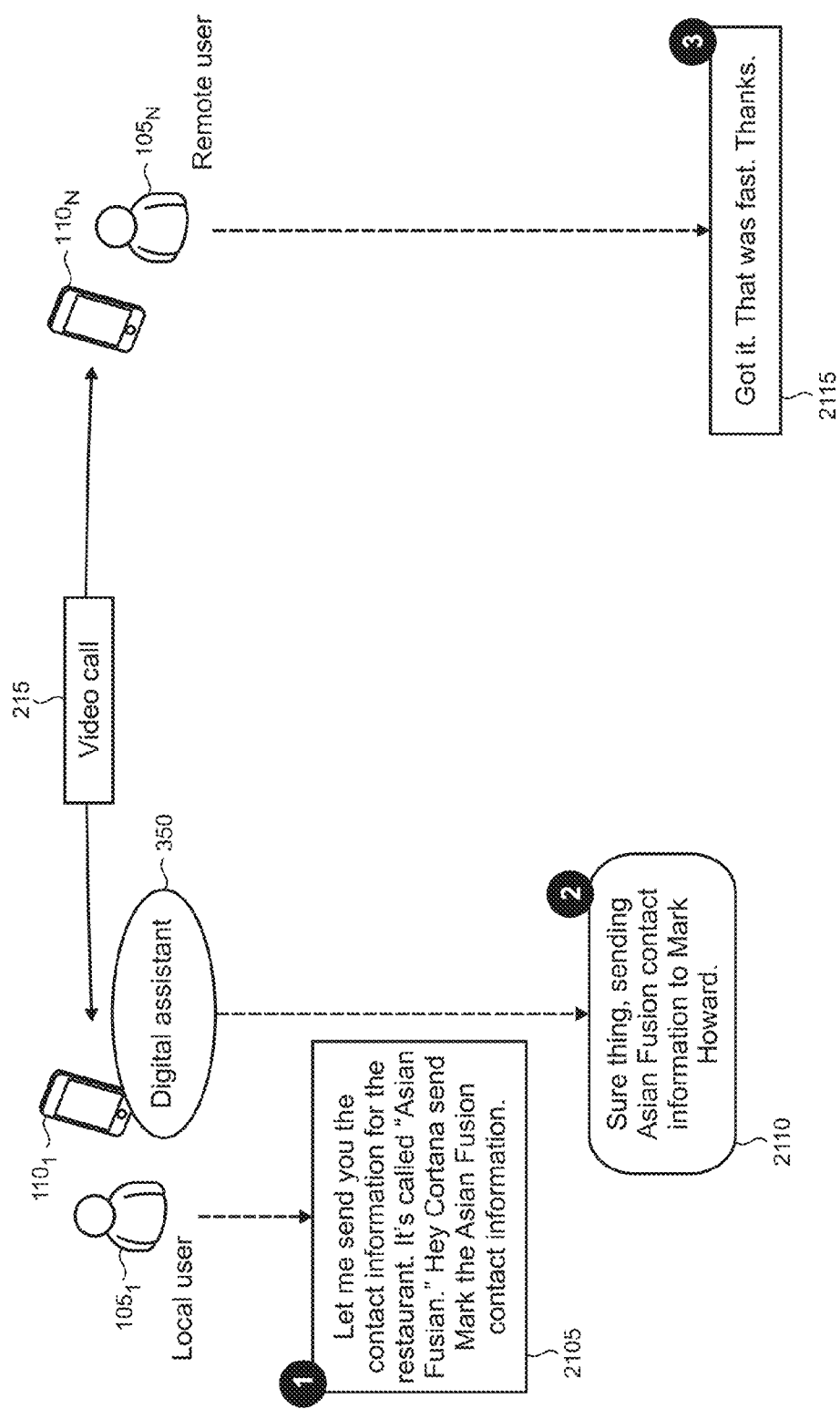
FIG. 21 shows an illustrative transcript of audio interactions among a digital assistant and parties to a video call.

FIGS. 21 to 24 illustratively show how the digital assistant can be utilized in the course of a video call 215 between local and remote parties. FIG. 21 shows a transcript of the audio portion of the video call in which the local user launches the digital assistant by saying "Hey Cortana" at point 1 in the video call at block 2105. The local user then requests that the digital assistant send restaurant contact information to the remote user. FIG. 22 shows UIs 2205 and 2210 respectively exposed by video call apps on the local and remote devices at point 1 in the video call. Each UI shows a large video image of the party at the other end of the video call along with a smaller inset image of the user of the device (that is, in a typical video call, users can see the other person in large view on a video call app UI, and see themselves in a small view).

In a similar manner to the voice call example discussed above, a PIP overlay 2215 is inserted in the video image presented in the UI on the local device. The PIP overlay in this example includes the graphic object and text string associated with the digital assistant. The outgoing video stream from the local device is also configured to include a PIP overlay 2220 that can be shown on the video call app UI on the remote device. Accordingly, the interaction between the local user and the digital assistant in the context of a video call is indicated to the remote user using the video PIP overlay 2220.

Figure 23:
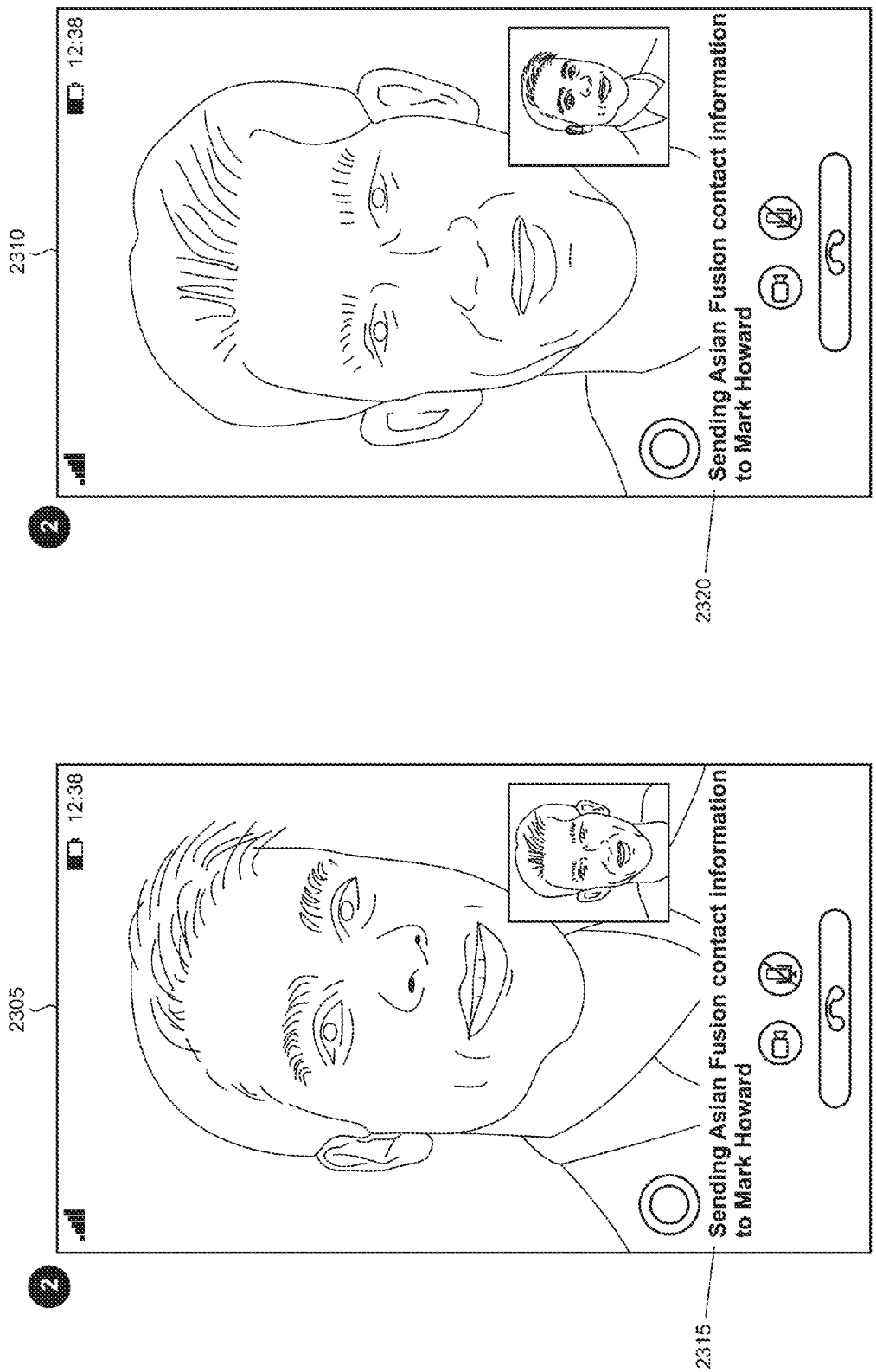

FIG. 23 shows video app UIs 2305 and 2310 on the local and remote devices, respectively, when the digital assistant responds to the user's request at point 2 in the video call at block 2110 in FIG. 21. Text strings 2315 and 2320 are displayed in the video PIP overlays on the respective video app's UIs to visually confirm to the local and remote users what the digital assistant is saying verbally in the video call, namely that the restaurant contact information is being sent to the remote user at the far end of the video call.

Figure 24:
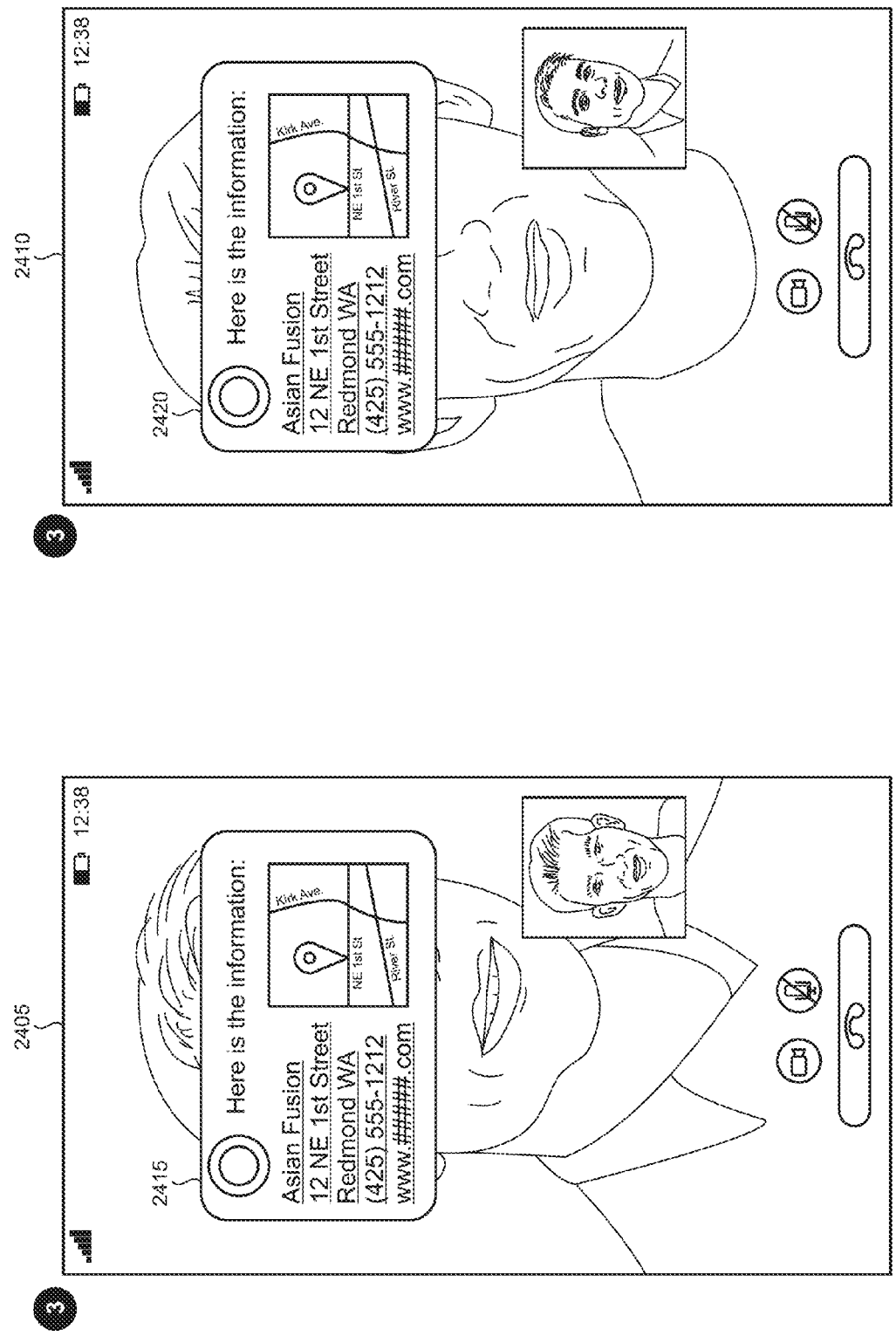

FIG. 24 shows video app UIs 2405 and 2410 on the local and remote devices, respectively, when the digital assistant responds to the user's request at point 3 in the video call at block 2115 in FIG. 21. Contact information is shown in windows 2415 and 2420 on the respective video app's UIs over the video stream. In this example, the windows include the name and address of the restaurant of interest as links that may be followed for more information. A map, in this example, is also provided that can typically be used to launch a map app on a respective device.

Figure 25:
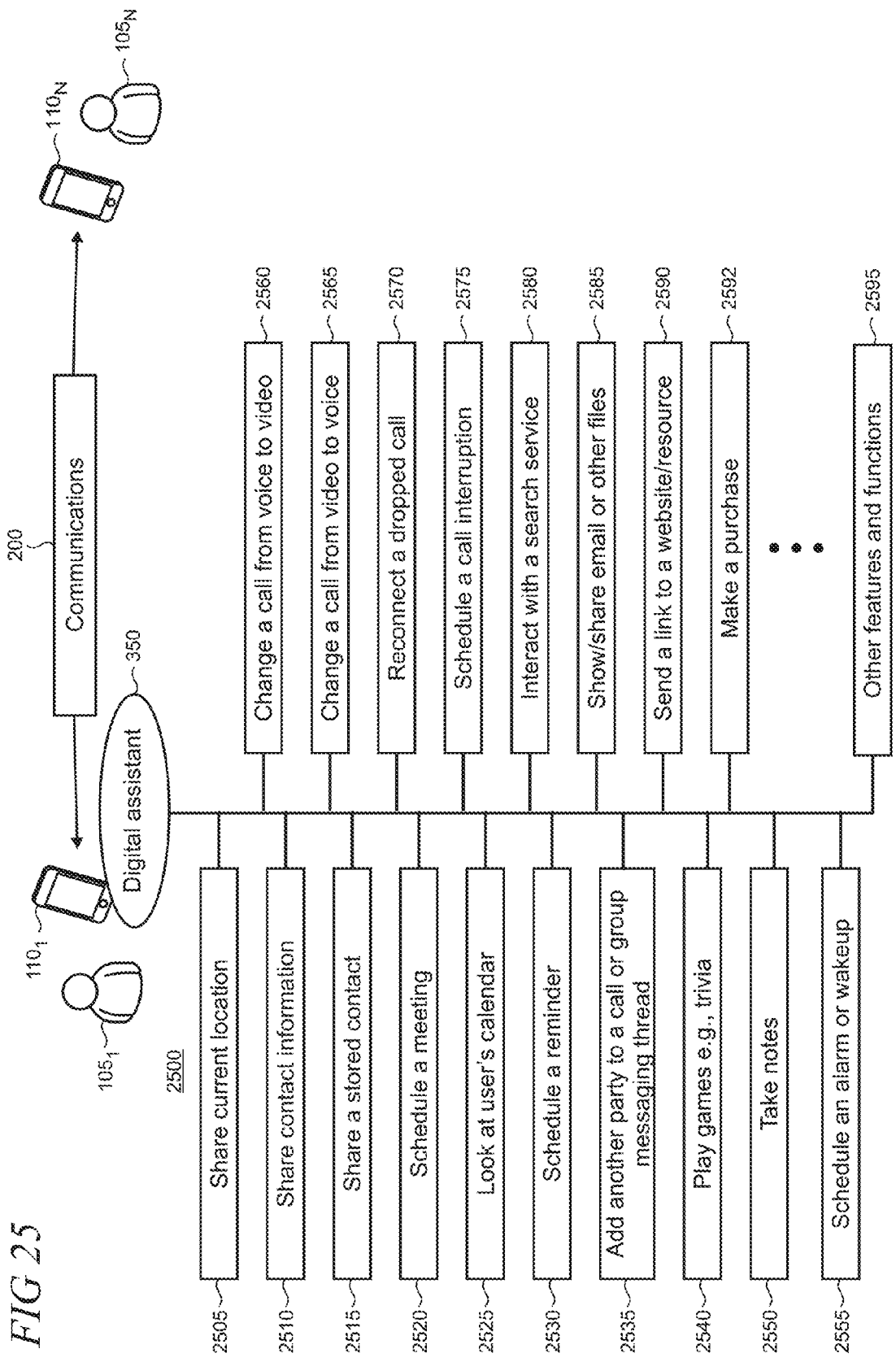
FIG. 25 show an illustrative taxonomy of functions that may be performed by a digital assistant during communications.

The three illustrative examples of the use of the digital assistant in communications—in voice calling, messaging, and video calling—are provided to highlight certain principles of the present use of a digital assistant in communications. However, it is emphasized that the digital assistant is not limited to the performing of the tasks and the providing of information as shown in the above examples. FIG. 25 provides a taxonomy 2500 of various illustrative examples of features that may be provided, and functions that may be performed by the digital assistant in communications 200.

As shown, the taxonomy includes the digital assistant: sharing a current location (as indicated by reference numeral 2505); sharing contact information 2510; sharing a stored contact 2515; scheduling a meeting 2520; looking at a user's calendar 2525; scheduling a reminder 2530 (for example, a remote user on a call might ask the local user to pick milk up on the way home from work; the digital assistant listens to the call and can schedule the reminder and then prompt the user when leaving work); adding another party to a current call or group messaging thread 2535; playing games 2540 such as trivia (in which the digital assistant can act as an emcee for the game and/or provide answers); taking notes 2550; scheduling an alarm or wakeup reminder 2555; changing a current call from a voice call to a video call 2560; changing a current call from a video call to a voice call 2565; reconnecting a dropped call 2570; scheduling a call interruption 2575 (e.g., asking the digital assistant to place an incoming call at a particular time to a device as a way of interrupting a current call, meeting, or interaction—for example, as a way of providing an excuse to end the current call, leave the meeting, etc.); interacting with a search service 2580 such as Microsoft Bing™ to perform searches and surface information pertaining, for example, to movie times, restaurants, travel, weather, traffic, directions, etc.; showing or sharing emails and/or other files 2585; sending a link to a website or other resource 2590; make a purchase 2592 (e.g., from an online store, website, etc.) or, providing other features and performing other functions 2595.

In an illustrative example, the digital assistant can be configured to maintain an awareness of the user's schedule, activities, behaviors, and other contexts to provide other services beyond those provided in an in-call experience. For example, the digital assistant can determine from the user's calendar and location that the user is running late for a meeting. The user may prefer not to send an email (as the meeting attendees might not check their email and/or if the user is driving, it may not be possible to pull over to send an email). Instead, the digital assistant can offer to place a call on the user's behalf to inform the other meeting attendees of the user's late status and to let them know the user is on the way. In some cases, the digital assistant can expose a UI to the remote users (i.e., meeting attendees) that enables them to request a call with the user. In this case, the digital assistant can ring the user and connect the parties when the call is answered.

In another illustrative example, when the digital assistant detects that the user is late for a meeting or is likely to be late for a meeting (e.g., the meeting location is across campus, and the user is located at the office without enough time to get there), the digital assistant can set up a conference bridge using voice or video and invite the meeting participants to join the bridge with the appropriate instructions. When the meeting is scheduled to start, the digital assistant can place a call into the conference bridge on the user's behalf.

Figure 26:
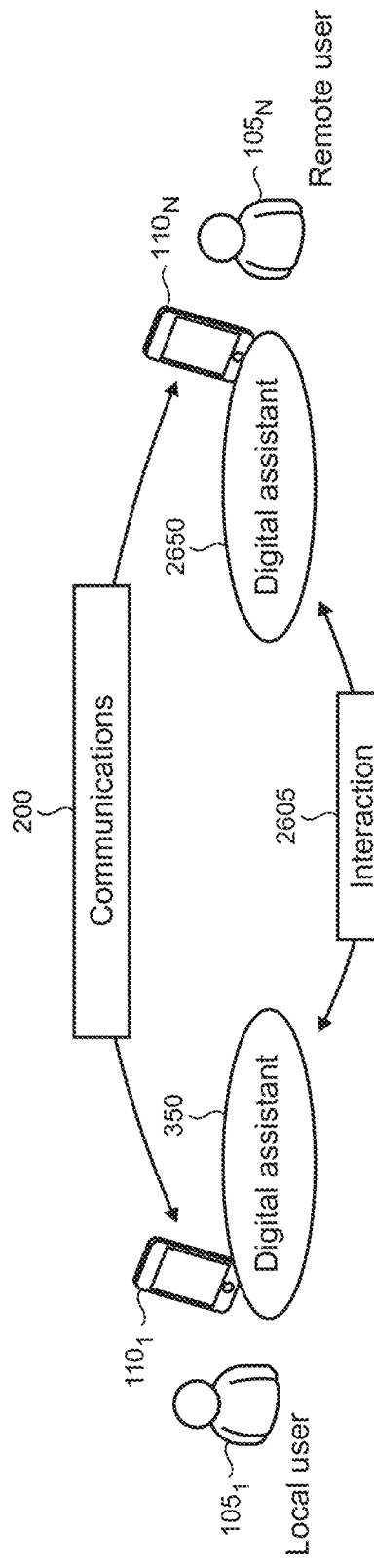
FIG. 26 shows an illustrative arrangement in which digital assistants on different devices can interact with each other.

FIG. 26 shows an illustrative example where devices used by each of the local and remote users are configured with respective digital assistants 350 and 2650. In this case, the digital assistants can interact with each other, as indicated by reference numeral 2605, in order to enhance the user experience during the course of communications 200 between the parties. For example, a digital assistant 350 on the local device can request calendar information for the remote user from the digital assistant 2650 on the remote device in order to schedule a future meeting between the parties.

Figure 27:
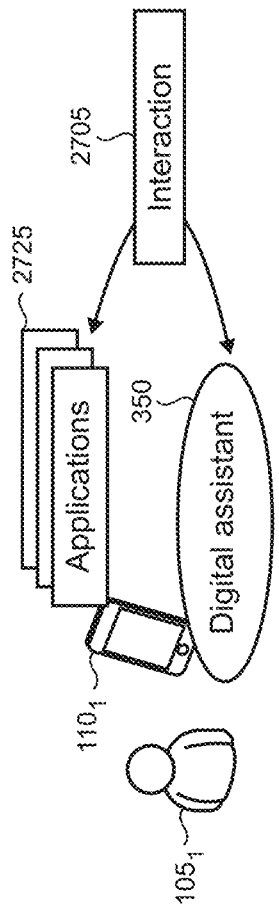
FIG. 27 shows an illustrative arrangement in which applications may interact with a digital assistant.

FIG. 27 shows an illustrative example in which apps 2725 on the device 110 may interact with the digital assistant 350 as indicated by reference numeral 2705. For example, as shown in screen captures of illustrative messaging app UIs in FIGS. 28 and 29, the user 105 can use a messaging app to send text messages to interact with the digital assistant instead of using voice commands as in the examples above. User text messages are shown on the right in the UIs and the messages generated by the digital assistant are shown on the left. Texting enables the interactions between the user and the digital assistant to occur relatively silently (and asynchronously which is often a preferred mode of communication) which can be advantageous, for example, when the user is at a location where the use of voice or gestures is not possible or is inappropriate. In some cases silent operation can be implemented and/or further enhanced in the context of voice and video communications by disabling speaker phone operation so that the digital assistant's voice can only heard when the device is held to the user's ear or by using an audio endpoint device such as headset or earphone. In such cases, the digital assistant can provide information to the user privately as if whispering in the user's ear.

In another illustrative example, the digital assistant can be configured to answer incoming voice and video calls when the user is busy. The digital assistant can explain that the user is unavailable and provide a UI that enables the remote user to leave a message using audio or text. The UI can display text for the message and the digital assistant can read back the message to the remote user as well in some cases.

Figure 28:
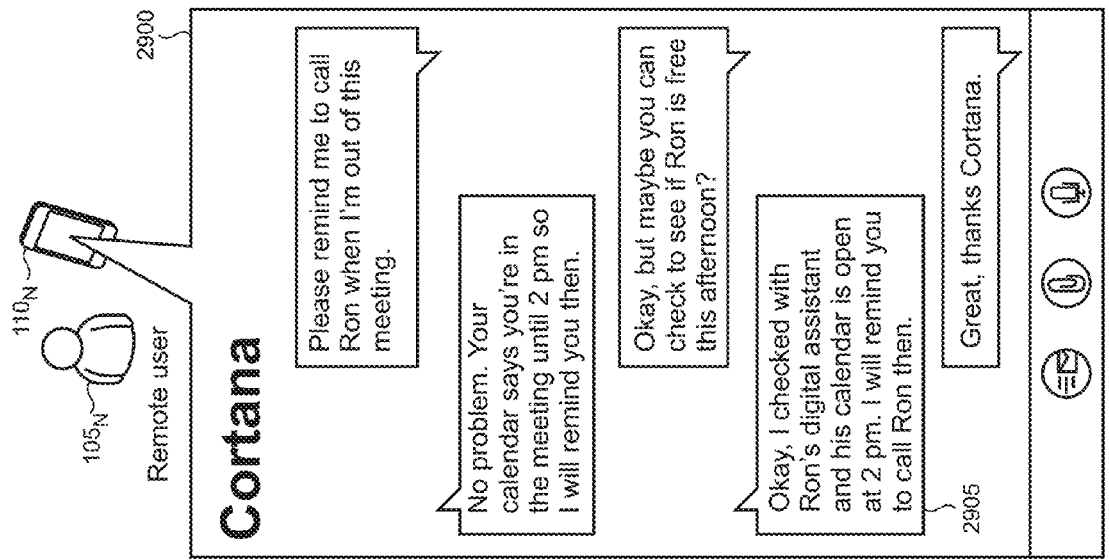
FIGS. 28 and 29 show screen captures of various UIs exposed by a messaging application when interacting with a digital assistant.
Figure 29:
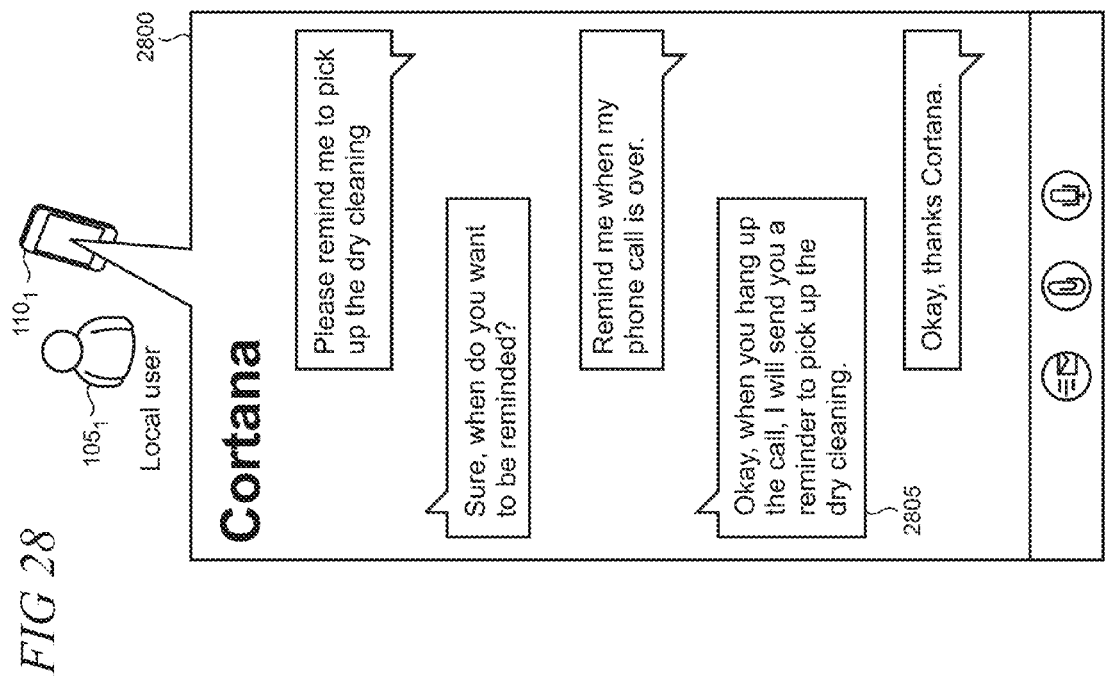

UI 2800 in FIG. 28 shows one illustrative example in which the user texts the digital assistant. Here, the digital assistant can use context from the device's phone call state to trigger a reminder at an appropriate time to the user, as indicated in the text message shown in block 2805. UI 2900 in FIG. 29 shows another illustrative example in which the digital assistant on the local device interacts with a digital assistant on a remote device in order to schedule a meeting between the parties, as indicated in the text message shown in block 2905.

Figure 30:
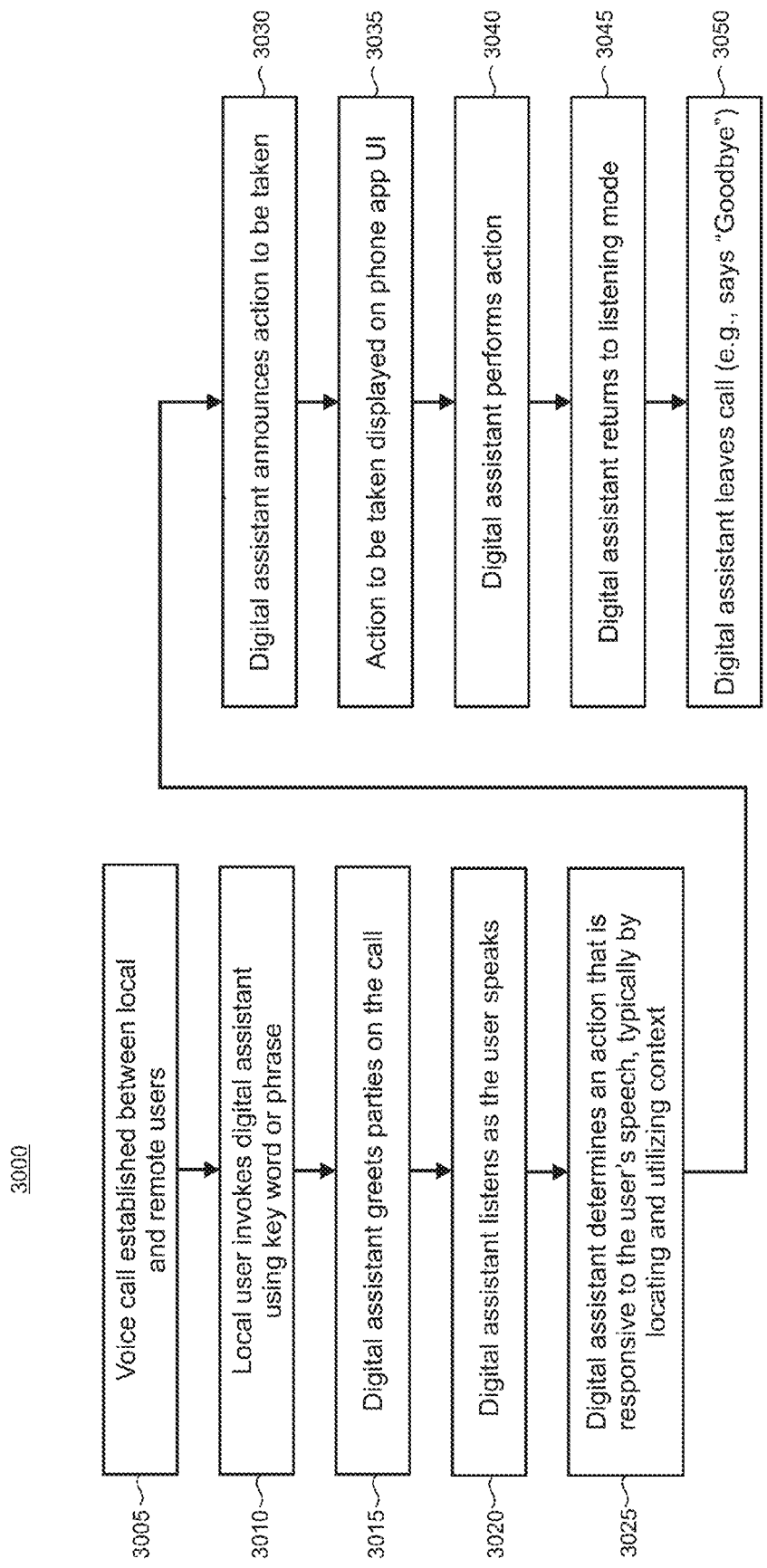
FIGS. 30, 31, and 32 show illustrative methods that may be performed when implementing the present use of a digital assistant in communications.

FIG. 30 shows a flowchart of an illustrative method 3000 in which a digital assistant participates in a voice call between local and remote parties. Unless specifically stated, the methods or steps shown in the flowcharts below and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 3005 a voice call is established between devices used by local and remote parties. The digital assistant sets up a listener so that during the call the local user can invoke the digital assistant by saying a key word or phrase in step 3010. Typically, as shown in step 3015, the digital assistant greets each of the parties on the call. As the digital assistant maintains an awareness of call context, including the identities of the parties, the greeting can be personalized by name in some cases. The greeting lets everybody know that the digital assistant is a party to the call and is ready to perform tasks and provide services. As the user speaks, the digital assistant listens, as shown in step 3020.

In step 3025, the digital assistant determines an action it can take that is responsive to the user's speech. In typical implementations, applicable context is located and utilized when making the determination. That is, the digital assistant can take different actions, in some cases, depending on context including call state. In addition, the digital assistant can be configured to ask questions of the user, for example, to clarify the request, or perform some follow-up interaction with the user as may be needed when completing a task. Audio is injected into the stream of the call so that the local and remote users can hear the digital assistant acknowledge the user's request and announce the action it is taking in response to the request (i.e., whether it be sharing contact information, taking a note, adding someone to the call, etc.) in step 3030.

In addition to the digital assistant verbally announcing the action, the action is displayed using text or graphics on the phone app's UI on the local device in step 3035 and the digital assistant performs the action in step 3040. In some implementations, the digital assistant may ask that the user confirm the announced action before it is taken. In step 3045, the digital assistant returns to listening mode and listens to the user speaking on the call, and the method 3000 can repeat from step 3020 on, as appropriate. Alternatively, the digital assistant can leave the voice call and make an announcement to that effect (e.g., by saying "goodbye") as shown in step 3050.

Figure 31:
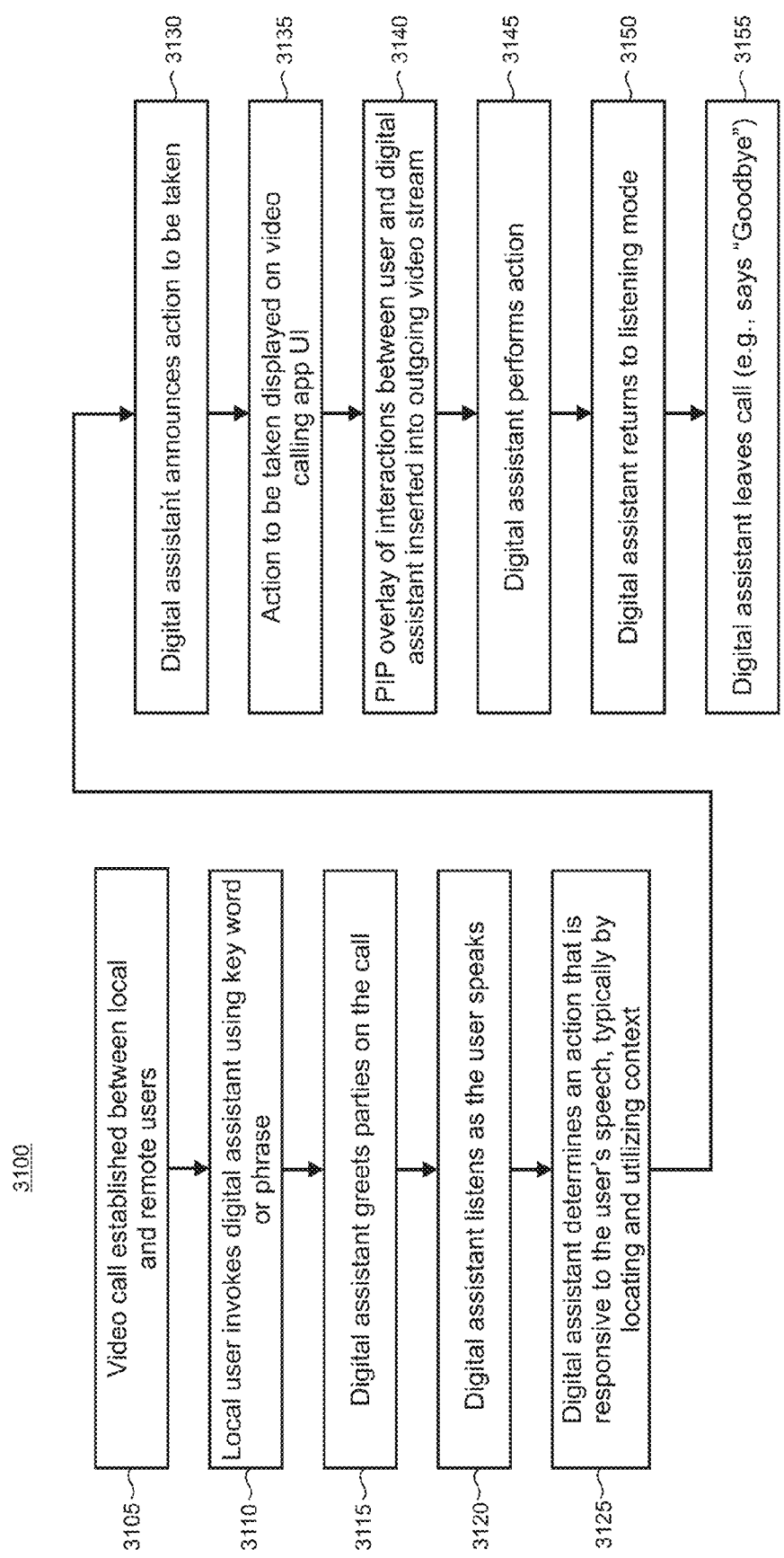

FIG. 31 shows a flowchart of an illustrative method 3100 in which a digital assistant participates in a video call between local and remote parties. In step 3105 a video call is established between devices used by local and remote parties. The digital assistant sets up a listener so that during the video call the local user can invoke the digital assistant by saying a key word or phrase in step 3110. In step 3115, the digital assistant greets each of the parties to the video call (in which the greeting can be personalized by name) to announce its presence. As the user speaks, the digital assistant listens in, as shown in step 3120.

In step 3125, the digital assistant determines an action it can take that is responsive to the user's speech. In typical implementations, applicable context is located and utilized when making the determination as is the case with the example of a voice call described above. In addition, the digital assistant can be configured to ask questions of the user, for example, to clarify the request, or perform some follow-up interaction with the user as may be needed when completing a task. Audio is injected into the stream of the call so that the local and remote users can hear the digital assistant acknowledge the user's request and announce the action it is taking in response to the request in step 3130.

In addition to the digital assistant verbally announcing the action, the action is displayed using text or graphics on the phone app's UI on the local device in step 3135. A PIP overlay that shows the interactions between the local user and the digital assistant is injected into the outgoing video stream in step 3140, so that the remote user is visually informed as to what is happening with the digital assistant.

The digital assistant performs the action in step 3145. In some implementations, the digital assistant may ask that the user confirm the announced action before it is taken. In step 3150, the digital assistant returns to listening mode and listens to the user speaking on the video call, and the method 3100 can repeat from step 3120 on, as appropriate. Alternatively, the digital assistant can leave the video call and make an announcement to that effect (e.g., by saying "goodbye") as shown in step 3155.

Figure 32:
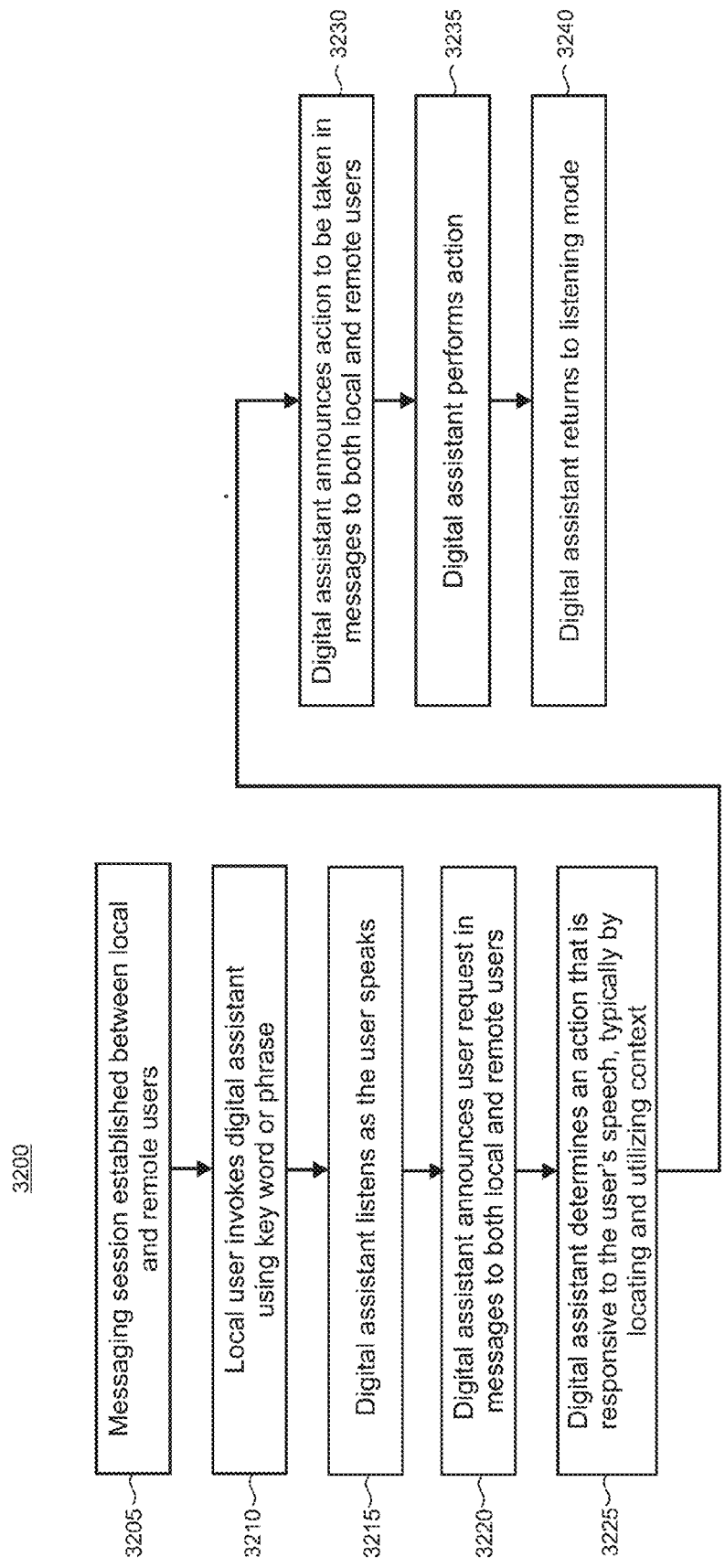

FIG. 32 shows a flowchart of an illustrative method 3200 in which a digital assistant participates in a messaging session between local and remote parties. In step 3205 a messaging session is established between devices used by local and remote parties. The digital assistant sets up a listener so that during the messaging session the local user can invoke the digital assistant by saying a key word or phrase in step 3210. As the user speaks, the digital assistant listens in, as shown in step 3215.

In step 3220, the digital assistant announces a request from the local user using text messages that are sent to both the local and remote users which can be shown on the UI of the messaging app. In step 3225, the digital assistant determines an action it can take that is responsive to the user's speech. In typical implementations, applicable context is located and utilized when making the determination as is the case with the example of the voice and video calls described above. In step 3230, the digital assistant acknowledges the user's request and announces the action it is taking in response using text messages that are sent to both the local and remote users which can be shown on the UI of the messaging app.

The digital assistant performs the action in step 3235. In step 3240, the digital assistant returns to listening mode and listens to the user speaking on the video call, and the method 3200 can repeat from step 3215 on, as appropriate.

Figure 33:
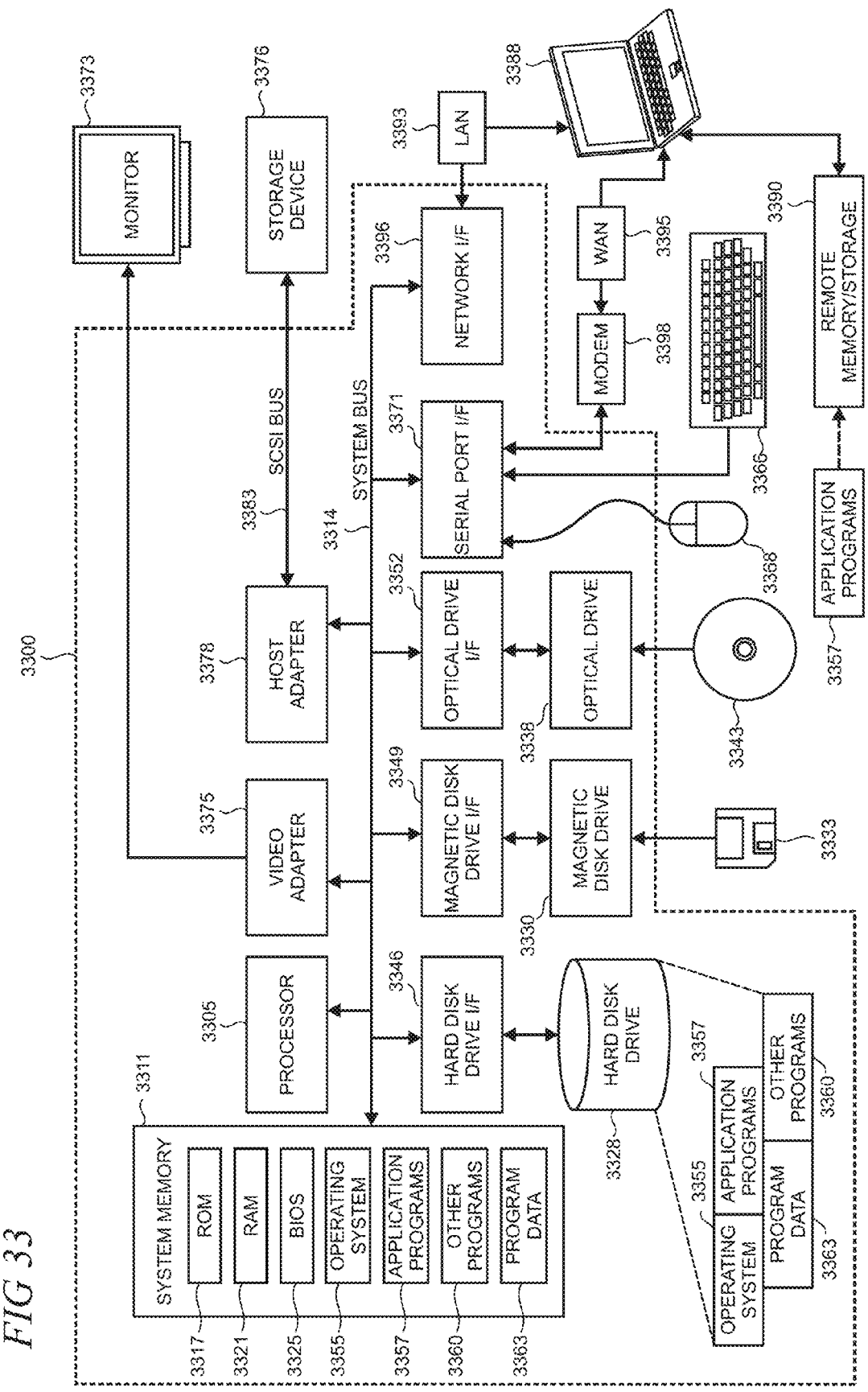
FIG. 33 is a simplified block diagram of an illustrative computer system such as a personal computer (PC) that may be used in part to implement the present use of a digital assistant in communications.

FIG. 33 is a simplified block diagram of an illustrative computer system 3300 such as a PC, client machine, or server with which the present use of a digital assistant in communications may be implemented. Computer system 3300 includes a processor 3305, a system memory 3311, and a system bus 3314 that couples various system components including the system memory 3311 to the processor 3305. The system bus 3314 may be any of several types of bus structures including a memory bus or memory controller, a peripheral bus, or a local bus using any of a variety of bus architectures. The system memory 3311 includes read only memory (ROM) 3317 and random access memory (RAM) 3321. A basic input/output system (BIOS) 3325, containing the basic routines that help to transfer information between elements within the computer system 3300, such as during startup, is stored in ROM 3317. The computer system 3300 may further include a hard disk drive 3328 for reading from and writing to an internally disposed hard disk (not shown), a magnetic disk drive 3330 for reading from or writing to a removable magnetic disk 3333 (e.g., a floppy disk), and an optical disk drive 3338 for reading from or writing to a removable optical disk 3343 such as a CD (compact disc), DVD (digital versatile disc), or other optical media. The hard disk drive 3328, magnetic disk drive 3330, and optical disk drive 3338 are connected to the system bus 3314 by a hard disk drive interface 3346, a magnetic disk drive interface 3349, and an optical drive interface 3352, respectively. The drives and their associated computer-readable storage media provide non-volatile storage of computer-readable instructions, data structures, program modules, and other data for the computer system 3300. Although this illustrative example includes a hard disk, a removable magnetic disk 3333, and a removable optical disk 3343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present use of a digital assistant in communications. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 3333, optical disk 3343, ROM 3317, or RAM 3321, including an operating system 3355, one or more application programs 3357, other program modules 3360, and program data 3363. A user may enter commands and information into the computer system 3300 through input devices such as a keyboard 3366 and pointing device 3368 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 3305 through a serial port interface 3371 that is coupled to the system bus 3314, but may be connected by other interfaces, such as a parallel port, game port, or universal serial bus (USB). A monitor 3373 or other type of display device is also connected to the system bus 3314 via an interface, such as a video adapter 3375. In addition to the monitor 3373, personal computers typically include other peripheral output devices (not shown), such as speakers and printers. The illustrative example shown in FIG. 33 also includes a host adapter 3378, a Small Computer System Interface (SCSI) bus 3383, and an external storage device 3376 connected to the SCSI bus 3383.

The computer system 3300 is operable in a networked environment using logical connections to one or more remote computers, such as a remote computer 3388. The remote computer 3388 may be selected as another personal computer, a server, a router, a network PC, a peer device, or other common network node, and typically includes many or all of the elements described above relative to the computer system 3300, although only a single representative remote memory/storage device 3390 is shown in FIG. 33. The logical connections depicted in FIG. 33 include a local area network (LAN) 3393 and a wide area network (WAN) 3395. Such networking environments are often deployed, for example, in offices, enterprise-wide computer networks, intranets, and the Internet.

When used in a LAN networking environment, the computer system 3300 is connected to the local area network 3393 through a network interface or adapter 3396. When used in a WAN networking environment, the computer system 3300 typically includes a broadband modem 3398, network gateway, or other means for establishing communications over the wide area network 3395, such as the Internet. The broadband modem 3398, which may be internal or external, is connected to the system bus 3314 via a serial port interface 3371. In a networked environment, program modules related to the computer system 3300, or portions thereof, may be stored in the remote memory storage device 3390. It is noted that the network connections shown in FIG. 33 are illustrative and other means of establishing a communications link between the computers may be used depending on the specific requirements of an application of the present use of a digital assistant in communications.

Figure 34:
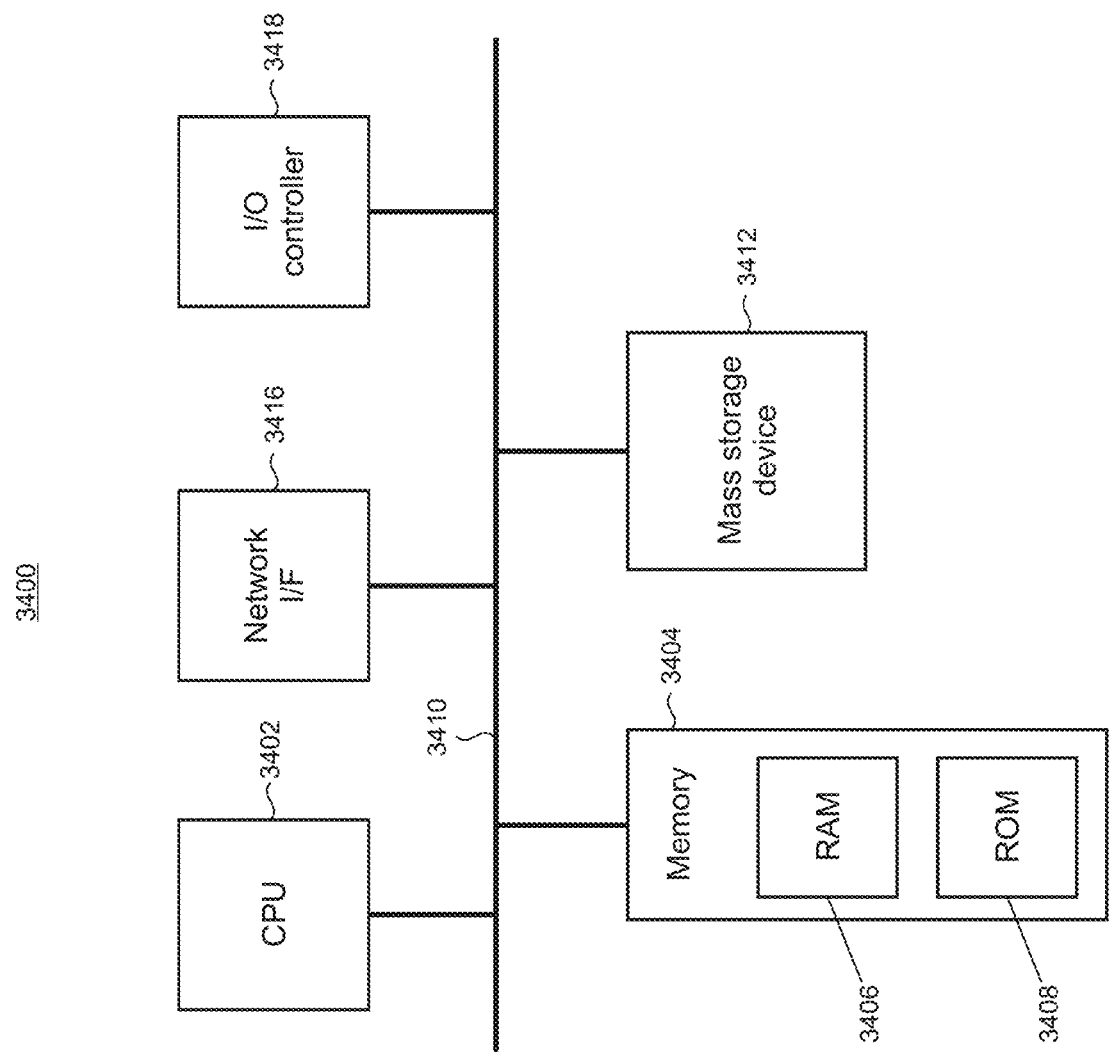
FIG. 34 shows a block diagram of an illustrative device that may be used in part to implement the present use of a digital assistant in communications.

FIG. 34 shows an illustrative architecture 3400 for a device capable of executing the various components described herein for providing the present use of a digital assistant in communications. Thus, the architecture 3400 illustrated in FIG. 34 shows an architecture that may be adapted for a server computer, mobile phone, a PDA, a smartphone, a desktop computer, a netbook computer, a tablet computer, GPS device, gaming console, and/or a laptop computer. The architecture 3400 may be utilized to execute any aspect of the components presented herein.

The architecture 3400 illustrated in FIG. 34 includes a CPU (Central Processing Unit) 3402, a system memory 3404, including a RAM 3406 and a ROM 3408, and a system bus 3410 that couples the memory 3404 to the CPU 3402. A basic input/output system containing the basic routines that help to transfer information between elements within the architecture 3400, such as during startup, is stored in the ROM 3408. The architecture 3400 further includes a mass storage device 3412 for storing software code or other computer-executed code that is utilized to implement applications, the file system, and the operating system.

The mass storage device 3412 is connected to the CPU 3402 through a mass storage controller (not shown) connected to the bus 3410. The mass storage device 3412 and its associated computer-readable storage media provide non-volatile storage for the architecture 3400.

Although the description of computer-readable storage media contained herein refers to a mass storage device, such as a hard disk or CD-ROM drive, it should be appreciated by those skilled in the art that computer-readable storage media can be any available storage media that can be accessed by the architecture 3400.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 3400.

According to various embodiments, the architecture 3400 may operate in a networked environment using logical connections to remote computers through a network. The architecture 3400 may connect to the network through a network interface unit 3416 connected to the bus 3410. It should be appreciated that the network interface unit 3416 also may be utilized to connect to other types of networks and remote computer systems. The architecture 3400 also may include an input/output controller 3418 for receiving and processing input from a number of other devices, including a keyboard, mouse, or electronic stylus (not shown in FIG. 34). Similarly, the input/output controller 3418 may provide output to a display screen, a printer, or other type of output device (also not shown in FIG. 34).

It should be appreciated that the software components described herein may, when loaded into the CPU 3402 and executed, transform the CPU 3402 and the overall architecture 3400 from a general-purpose computing system into a special-purpose computing system customized to facilitate the functionality presented herein. The CPU 3402 may be constructed from any number of transistors or other discrete circuit elements, which may individually or collectively assume any number of states. More specifically, the CPU 3402 may operate as a finite-state machine, in response to executable instructions contained within the software modules disclosed herein. These computer-executable instructions may transform the CPU 3402 by specifying how the CPU 3402 transitions between states, thereby transforming the transistors or other discrete hardware elements constituting the CPU 3402.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 3400 in order to store and execute the software components presented herein. It also should be appreciated that the architecture 3400 may include other types of computing devices, including handheld computers, embedded computer systems, smartphones, PDAs, and other types of computing devices known to those skilled in the art. It is also contemplated that the architecture 3400 may not include all of the components shown in FIG. 34, may include other components that are not explicitly shown in FIG. 34, or may utilize an architecture completely different from that shown in FIG. 34.

Figure 35:
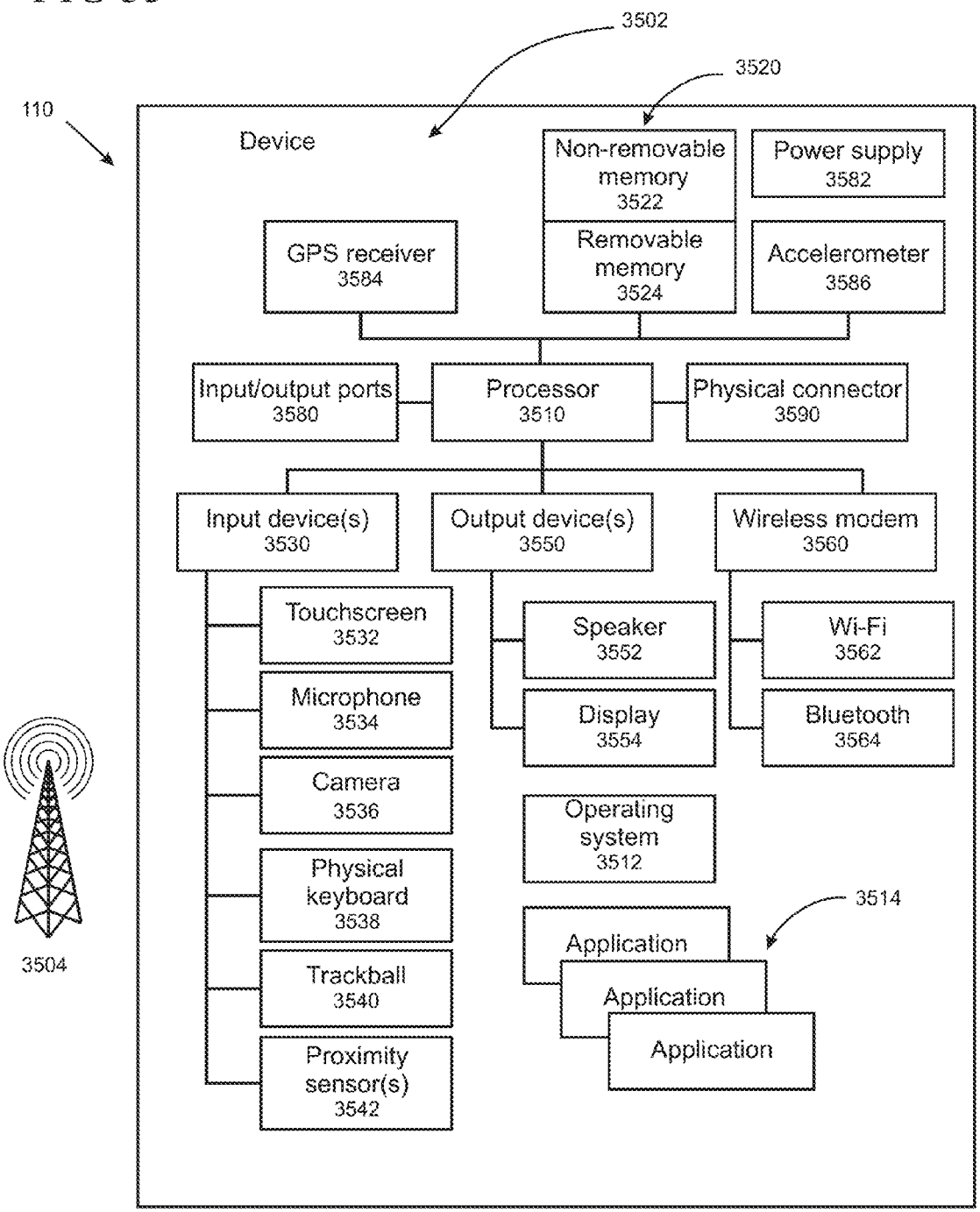
FIG. 35 is a block diagram of an illustrative mobile device.

FIG. 35 is a functional block diagram of an illustrative device 110 such as a mobile phone or smartphone including a variety of optional hardware and software components, shown generally at 3502. Any component 3502 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 3504, such as a cellular or satellite network.

The illustrated device 110 can include a controller or processor 3510 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 3512 can control the allocation and usage of the components 3502, including power states, above-lock states, and below-lock states, and provides support for one or more application programs 3514. The application programs can include common mobile computing applications (e.g., image-capture applications, email applications, calendars, contact managers, web browsers, messaging applications), or any other computing application.

The illustrated device 110 can include memory 3520. Memory 3520 can include non-removable memory 3522 and/or removable memory 3524. The non-removable memory 3522 can include RAM, ROM, Flash memory, a hard disk, or other well-known memory storage technologies. The removable memory 3524 can include Flash memory or a Subscriber Identity Module (SIM) card, which is well known in GSM (Global System for Mobile communications) systems, or other well-known memory storage technologies, such as "smart cards." The memory 3520 can be used for storing data and/or code for running the operating system 3512 and the application programs 3514. Example data can include web pages, text, images, sound files, video data, or other data sets to be sent to and/or received from one or more network servers or other devices via one or more wired or wireless networks.

The memory 3520 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 3520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 3530; such as a touch screen 3532; microphone 3534 for implementation of voice input for voice recognition, voice commands and the like; camera 3536; physical keyboard 3538; trackball 3540; and/or proximity sensor 3542; and one or more output devices 3550, such as a speaker 3552 and one or more displays 3554. Other input devices (not shown) using gesture recognition may also be utilized in some cases. Other possible output devices (not shown) can include piezoelectric or haptic output devices. Some devices can serve more than one input/output function. For example, touchscreen 3532 and display 3554 can be combined into a single input/output device.

A wireless modem 3560 can be coupled to an antenna (not shown) and can support two-way communications between the processor 3510 and external devices, as is well understood in the art. The modem 3560 is shown generically and can include a cellular modem for communicating with the mobile communication network 3504 and/or other radio-based modems (e.g., Bluetooth 3564 or Wi-Fi 3562). The wireless modem 3560 is typically configured for communication with one or more cellular networks, such as a GSM network for data and voice communications within a single cellular network, between cellular networks, or between the device and a public switched telephone network (PSTN).

The device can further include at least one input/output port 3580, a power supply 3582, a satellite navigation system receiver 3584, such as a GPS receiver, an accelerometer 3586, a gyroscope (not shown), and/or a physical connector 3590, which can be a USB port, IEEE 1394 (FireWire) port, and/or an RS-232 port. The illustrated components 3502 are not required or all-inclusive, as any components can be deleted and other components can be added.

Figure 36:
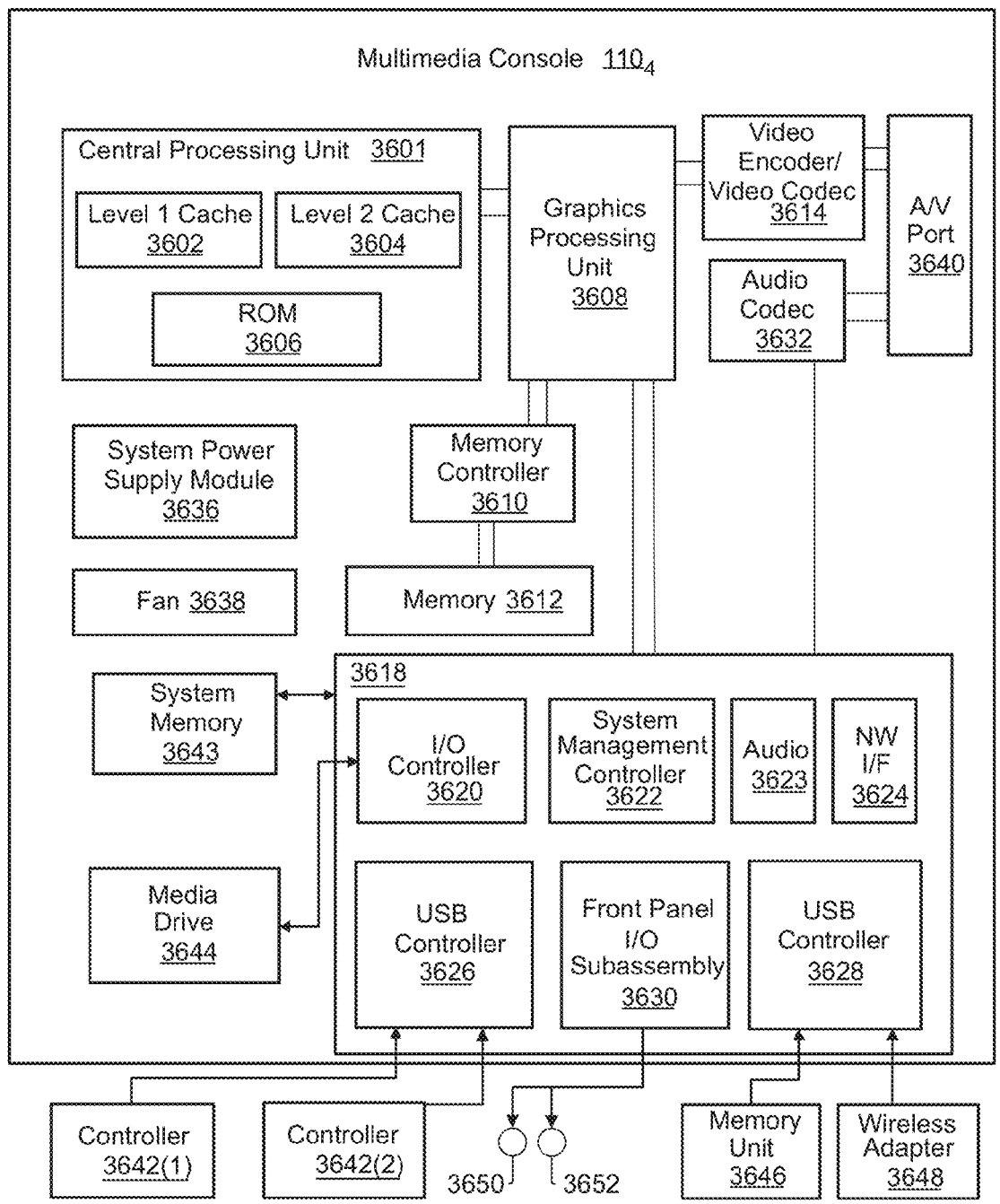
FIG. 36 is a block diagram of an illustrative multimedia console.

FIG. 36 is an illustrative functional block diagram of a multimedia console $110_4$. The multimedia console $110_4$ has a central processing unit (CPU) 3601 having a level 1 cache 3602, a level 2 cache 3604, and a Flash ROM (Read Only Memory) 3606. The level 1 cache 3602 and the level 2 cache 3604 temporarily store data and hence reduce the number of memory access cycles, thereby improving processing speed and throughput. The CPU 3601 may be configured with more than one core, and thus, additional level 1 and level 2 caches 3602 and 3604. The Flash ROM 3606 may store executable code that is loaded during an initial phase of a boot process when the multimedia console $110_4$ is powered ON.

A graphics processing unit (GPU) 3608 and a video encoder/video codec (coder/decoder) 3614 form a video processing pipeline for high speed and high resolution graphics processing. Data is carried from the GPU 3608 to the video encoder/video codec 3614 via a bus. The video processing pipeline outputs data to an A/V (audio/video) port 3640 for transmission to a television or other display. A memory controller 3610 is connected to the GPU 3608 to facilitate processor access to various types of memory 3612, such as, but not limited to, a RAM.

The multimedia console $110_4$ includes an I/O controller 3620, a system management controller 3622, an audio processing unit 3623, a network interface controller 3624, a first USB (Universal Serial Bus) host controller 3626, a second USB controller 3628, and a front panel I/O subassembly 3630 that are preferably implemented on a module 3618. The USB controllers 3626 and 3628 serve as hosts for peripheral controllers 3642(1) and 3642(2), a wireless adapter 3648, and an external memory device 3646 (e.g., Flash memory, external CD/DVD ROM drive, removable media, etc.). The network interface controller 3624 and/or wireless adapter 3648 provide access to a network (e.g., the Internet, home network, etc.) and may be any of a wide variety of various wired or wireless adapter components including an Ethernet card, a modem, a Bluetooth module, a cable modem, or the like.

System memory 3643 is provided to store application data that is loaded during the boot process. A media drive 3644 is provided and may comprise a DVD/CD drive, hard drive, or other removable media drive, etc. The media drive 3644 may be internal or external to the multimedia console $110_4$. Application data may be accessed via the media drive 3644 for execution, playback, etc. by the multimedia console $110_4$. The media drive 3644 is connected to the I/O controller 3620 via a bus, such as a Serial ATA bus or other high speed connection (e.g., IEEE 1394).

The system management controller 3622 provides a variety of service functions related to assuring availability of the multimedia console $110_4$. The audio processing unit 3623 and an audio codec 3632 form a corresponding audio processing pipeline with high fidelity and stereo processing. Audio data is carried between the audio processing unit 3623 and the audio codec 3632 via a communication link. The audio processing pipeline outputs data to the A/V port 3640 for reproduction by an external audio player or device having audio capabilities.

The front panel I/O subassembly 3630 supports the functionality of the power button 3650 and the eject button 3652, as well as any LEDs (light emitting diodes) or other indicators exposed on the outer surface of the multimedia console $110_4$. A system power supply module 3636 provides power to the components of the multimedia console $110_4$. A fan 3638 cools the circuitry within the multimedia console $110_4$.

The CPU 3601, GPU 3608, memory controller 3610, and various other components within the multimedia console $110_4$ are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console $110_4$ is powered ON, application data may be loaded from the system memory 3643 into memory 3612 and/or caches 3602 and 3604 and executed on the CPU 3601. The application may present a graphical user interface that provides a consistent user experience when navigating to different media types available on the multimedia console $110_4$. In operation, applications and/or other media contained within the media drive 3644 may be launched or played from the media drive 3644 to provide additional functionalities to the multimedia console $110_4$.

The multimedia console $110_4$ may be operated as a standalone system by simply connecting the system to a television or other display. In this standalone mode, the multimedia console 110₄ allows one or more users to interact with the system, watch movies, or listen to music. However, with the integration of broadband connectivity made available through the network interface controller 3624 or the wireless adapter 3648, the multimedia console 110₄ may further be operated as a participant in a larger network community.

When the multimedia console 110₄ is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 110₄ boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 3601 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 3642(1) and 3642(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Based on the foregoing, it should be appreciated that technologies for use of a digital assistant in communications have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A device, comprising:
   one or more processors;
   a display that supports a user interface (UI) for interacting with a user of the device; and
   a memory device storing computer-readable instructions which, when executed by the one or more processors, perform a method comprising the steps of:
   listening in on an audio portion of a video call between local and remote parties,
   entering a listening mode by which listening to speech of the local party in the audio portion subsequent to a key word or key phrase being spoken is enabled,
   determining an action that is responsive to the speech, the determining including locating applicable context and utilizing the located applicable context,
   making an announcement of the determined action by injecting the announcement into the audio portion of the video call so that both the local and remote parties can hear the announcement,
   taking the determined action,
   returning to the listening mode; and
   generating an overlay that is included in an outgoing video stream from the device, the overlay including a representation of interactions between the local party and a digital assistant or the overlay including a representation of status of the digital assistant.

2. The device of claim 1 further including animating at least a portion of the overlay.

3. The device of claim 1 further including initiating the listening mode by using one of voice command, gesture, or manipulation of a virtual or physical control exposed by the device.

4. A device, comprising:
   one or more processors;
   a display that supports a user interface (UI) for interacting with a user of the device; and
   a memory device storing computer-readable instructions which, when executed by the one or more processors, perform a method comprising the steps of:
   listening in on an audio portion of a video call between local and remote parties,
   entering a listening mode by which listening to speech of the local party in the audio portion subsequent to a key word or key phrase being spoken is enabled,
   determining an action that is responsive to the speech, the determining including locating applicable context and utilizing the located applicable context,
   making an announcement of the determined action by injecting the announcement into the audio portion of the video call so that both the local and remote parties can hear the announcement,
   taking the determined action,
   returning to the listening mode, and naming parties in the video call to whom the determined action is applicable.

5. A device, comprising:

one or more processors;

a display that supports a user interface (UI) for interacting with a user of the device; and a memory device storing computer-readable instructions which, when executed by the one or more processors, perform a method comprising the steps of:

listening in on an audio portion of a video call between local and remote parties, entering a listening mode by which listening to speech of the local party in the audio portion subsequent to a key word or key phrase being spoken is enabled, determining an action that is responsive to the speech, the determining including locating applicable context and utilizing the located applicable context, using data provided by a remote service when making the action determination, or the action determination being made at least in part by an external service that operates substantially remotely from the device, making an announcement of the determined action by injecting the announcement into the audio portion of the video call so that both the local and remote parties can hear the announcement, taking the determined action, and returning to the listening mode.

* * * * *